United States Patent
Sano et al.

(10) Patent No.: US 9,764,293 B2
(45) Date of Patent: Sep. 19, 2017

(54) GAS SEPARATION COMPOSITE MEMBRANE, METHOD OF PRODUCING THE SAME, GAS SEPARATING MODULE USING THE SAME, AND GAS SEPARATION APPARATUS AND GAS SEPARATION METHOD

(71) Applicant: FUJIFILM Corporation, Minato-ku, Tokyo (JP)

(72) Inventors: Satoshi Sano, Ashigarakami-gun (JP); Ichiro Nagata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 377 days.

(21) Appl. No.: 14/450,454

(22) Filed: Aug. 4, 2014

(65) Prior Publication Data

US 2014/0352534 A1     Dec. 4, 2014

Related U.S. Application Data

(63) Continuation of application No. PCT/JP2013/053547, filed on Feb. 14, 2013.

(30) Foreign Application Priority Data

Feb. 17, 2012   (JP) ................... 2012-033398

(51) Int. Cl.
*B01D 53/22*     (2006.01)
*B01D 71/64*     (2006.01)
(Continued)

(52) U.S. Cl.
CPC .......... *B01D 71/64* (2013.01); *B01D 53/228* (2013.01); *B01D 69/10* (2013.01); *B05D 3/007* (2013.01);
(Continued)

(58) Field of Classification Search
CPC ...... B01D 71/64; B01D 53/228; B01D 69/10; B01D 2053/221; B01D 2323/30;
(Continued)

(56) References Cited

U.S. PATENT DOCUMENTS 4,277,583 A * 7/1981 Waitkus ............ C08G 59/4042
                                                            525/180
4,889,646 A * 12/1989 Vettel ................. C10M 133/52
                                                            508/316
(Continued)

FOREIGN PATENT DOCUMENTS

JP     04-110029 A     4/1992
JP     04-110030 A     4/1992
(Continued)

OTHER PUBLICATIONS

Communication dated Jul. 7, 2015 from the Japanese Patent Office in counterpart application No. 2012-033398.
(Continued)

*Primary Examiner* — Anthony Shumate
(74) *Attorney, Agent, or Firm* — Sughrue Mion, PLLC

(57) ABSTRACT

A gas separation composite membrane, containing: a gas-permeable supporting layer; and a gas separating layer containing a crosslinked polyimide resin, over the gas-permeable supporting layer, in which the crosslinked polyimide resin is composed of a polyimide compound having been crosslinked through an ester linking group, in which the polyimide compound contains a repeating unit of formula (I), a repeating unit of formula (II-a) or (II-b), and a repeating unit of formula (III-a) or (III-b), and in which a ratio [κ] of a site forming a crosslinked chain mediated by the ester linking group to an imide group (the number of specific crosslinkable sites/the number of imide groups) is more than 0.4 and less than 0.5.

13 Claims, 1 Drawing Sheet

(51) Int. Cl.
*B01D 69/10* (2006.01)
*C08G 73/10* (2006.01)
*B05D 3/00* (2006.01)
*B05D 3/06* (2006.01)
*C09D 179/08* (2006.01)

(52) U.S. Cl.
CPC ........... *B05D 3/06* (2013.01); *C08G 73/1039* (2013.01); *C08G 73/1042* (2013.01); *C08G 73/1067* (2013.01); *C08G 73/1078* (2013.01); *C09D 179/08* (2013.01); *B01D 2053/221* (2013.01); *B01D 2323/30* (2013.01)

(58) Field of Classification Search
CPC ...... B05D 3/007; B05D 3/06; C08G 73/1039; C08G 73/1042; C08G 73/1067; C08G 73/1078; C09D 179/08
See application file for complete search history.

(56) References Cited

U.S. PATENT DOCUMENTS

| | | | | |
|---|---|---|---|---|
| 4,952,220 | A * | 8/1990 | Langsam | B01D 67/0093 210/500.39 |
| 5,478,915 | A * | 12/1995 | Amone | C08G 73/1014 428/411.1 |
| 5,928,410 | A * | 7/1999 | Jois | B01D 53/228 55/DIG. 5 |
| 7,247,191 | B2 | 7/2007 | Koros et al. | |
| 2003/0126990 | A1* | 7/2003 | Koros | B01D 53/228 96/10 |
| 2003/0220188 | A1* | 11/2003 | Marand | B01D 53/228 502/60 |
| 2008/0214777 | A1* | 9/2008 | Poe | C08G 73/1014 528/338 |
| 2009/0008142 | A1* | 1/2009 | Shimizu | B32B 5/18 174/261 |
| 2009/0178561 | A1* | 7/2009 | Miller | C08G 73/1039 95/273 |
| 2009/0182097 | A1* | 7/2009 | Miller | B01D 67/0006 525/420 |
| 2010/0242723 | A1* | 9/2010 | Liu | B01D 71/64 95/46 |
| 2010/0243567 | A1 | 9/2010 | Liu et al. | |
| 2010/0270234 | A1 | 10/2010 | Liu et al. | |
| 2011/0232484 | A1* | 9/2011 | Yoshinaga | B01D 53/228 95/47 |
| 2011/0269915 | A1 | 11/2011 | Koros et al. | |
| 2013/0178597 | A1* | 7/2013 | Takasawa | C09D 179/08 528/346 |
| 2014/0130667 | A1* | 5/2014 | Sano | B01D 53/228 95/51 |
| 2014/0130668 | A1* | 5/2014 | Sano | C08G 73/1039 95/51 |
| 2014/0130669 | A1* | 5/2014 | Sano | C08G 73/10 95/51 |
| 2014/0296385 | A1* | 10/2014 | Blondel | C08L 23/0869 523/439 |
| 2014/0345456 | A1* | 11/2014 | Sano | B01D 71/64 95/51 |

FOREIGN PATENT DOCUMENTS

| | | |
|---|---|---|
| JP | 07-236822 A | 9/1995 |
| JP | 09-173801 A | 7/1997 |
| JP | 2004-277743 A | 10/2004 |
| JP | 2006-297335 A | 11/2006 |
| JP | 2007-044653 A | 2/2007 |
| JP | 2007-045969 A | 2/2007 |
| JP | 2007-297605 A | 11/2007 |
| JP | 2011-509819 A | 3/2011 |
| WO | 2013/015335 A1 | 1/2013 |
| WO | 2013/015336 A1 | 1/2013 |
| WO | 2013/015337 A1 | 1/2013 |
| WO | 2013/015338 A1 | 1/2013 |

OTHER PUBLICATIONS

Yuri Yampolskii et al., "Preface," Membranes for Gas and Vapor Separation, John Wiley & Sons, 2010, 4 pages (xvii-xx).
Richard W. Baker et al., "Natural Gas Processing with Membranes: An Overview," Ind. Eng. Chem. Res., 2008, pp. 2109-2121, vol. 47.
Richard W. Baker, "Future Directions of Membranes Gas Separation Technology," Ind. Eng. Chem. Res., 2002, pp. 1393-1411, vol. 41.
Claudia Staudt-Bickel et al., "Improvement of CO2/CH4 separation characteristics of polyimides by chemical crosslinking," Journal of Membrane Science, 1999, pp. 145-154, vol. 155.
William J. Koros et al., "Pushing the limits on possibilities for large scale gas separation: which strategies?," Journal of Membrane Science, 2000, pp. 181-196, vol. 175.
M Marek et al., "Crosslinked Ultra-Thin Polyimide Film as a Gas Separation Layer for Composite Membranes," Eur. Polym. J., 1997, pp. 1717-1721, vol. 33, No. 10-12.
International Search Report of PCT/JP2013/053547 dated May 7, 2013, 2 pgs.

* cited by examiner

{Fig. 1}
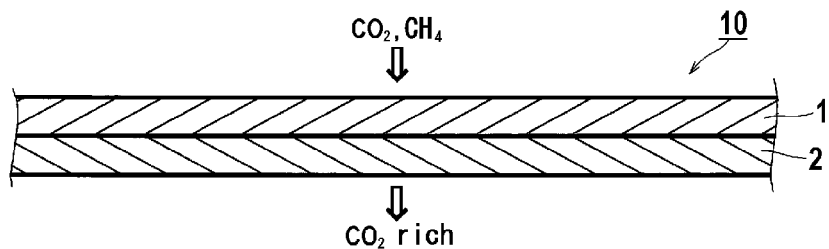
{Fig. 2}
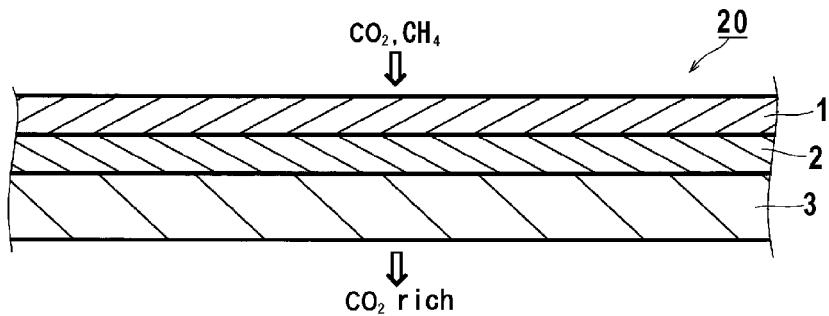

GAS SEPARATION COMPOSITE MEMBRANE, METHOD OF PRODUCING THE SAME, GAS SEPARATING MODULE USING THE SAME, AND GAS SEPARATION APPARATUS AND GAS SEPARATION METHOD

CROSS-REFERENCE TO RELATED APPLICATIONS

This application is a Continuation of PCT International Application No. PCT/JP2013/053547 filed on Feb. 14, 2013, which claims priority under 35 U.S.C. §119(a) to Japanese Patent Application No. 2012-033398 filed in Japan on Feb. 17, 2012. Each of the above applications is hereby expressly incorporated by reference, in its entirely, into the present application.

TECHNICAL FIELD

The present invention relates to a gas separation composite membrane and a method of producing the same, a gas separating module using the same, and a gas separation apparatus and a gas separation method.

BACKGROUND ART

Raw materials comprising polymer compounds each have characteristic gas permeability for the respective raw material. Based on properties thereof, a desired gas component can be separated, by allowing selective permeation, by means of a membrane constituted of a specific polymer compound. As an industrial application embodiment of this gas separation membrane, study has been conducted for separating and recovering carbon dioxide from a large-scale carbon dioxide source, in a thermal power station, a cement plant, a shaft furnace in a steel plant, or the like, in relation to the issue of global warming. Then, this membrane separation technique attracts attention as a solution to environmental issues, which is capable of allowing achievement with a relatively small energy. Meanwhile, natural gas or bio gas (gases generated by fermentation and anaerobic digestion, for example, of excreta of organisms, organic fertilizers, biodegradable substances, polluted water, garbages, energy crops, and the like) is mainly a mixed gas of methane and carbon dioxide. Study has been made so far for a membrane separation method as a means for removing an impurity, such as carbon dioxide, therein (see Patent Literature 1 and Patent Literature 2).

Specifically, study has been made for celluloses or polyimides as a raw material in purification of a natural gas. However, the membrane is plasticized under high pressure conditions and high carbon dioxide concentration in an actual plant, and a lowering of separation selectivity due to the plasticization has become a problem (see Non-Patent Literature 1, pp. 313-322; and Non-Patent Literatures 2 and 3). In order to suppress plasticization of the membrane, introduction of crosslinked structure into a polymer compound constituting the membrane is known to be effective, and research has been continued on a separation membrane using a polyimide resin (see Non-Patent Literature 1, pp. 3-27). Specific examples of utilization of a membrane having a crosslinked structure for the gas separation membrane include those described in Patent Literature 3, and Non-Patent Literatures 4, 5 and 6.

CITATION LIST

Patent Literatures

Patent Literature 1: JP-A-2007-297605 ("JP-A" means unexamined published Japanese patent application)
Patent Literature 2: JP-A-2006-297335
Patent Literature 3: U.S. Pat. No. 7,247,191

Non-Patent Literatures

Non-Patent Literature 1: Yuri Yampolskii and Benny Freeman, "Membrane Gas Separation"
Non-Patent Literature 2: Industrial and Engineering Chemistry Research, 2008, 47, 2109
Non-Patent Literature 3: Industrial and Engineering Chemistry Research, 2002, 41, 1393
Non-Patent Literature 4: Journal of Membrane Science, 1999, 155, 145
Non-Patent Literature 5: Journal of Membrane Science, 2000, 175, 181
Non-Patent Literature 6: European Polymer Journal, 1997, 33, 1717

SUMMARY OF THE INVENTION

Technical Problem

Incidentally, in order to constitute a practical gas separation membrane, sufficient gas permeability should be provided, by processing a raw material into a thin layer. Hitherto, an attempt has been made so far for processing a single raw layer into an asymmetric membrane, thereby processing a part contributing to separation into the thin layer referred to as a skin layer, to satisfy high gas permeability, separation selectivity, and also mechanical strength. However, the single raw material is difficult to be processed into one uniting these properties. Therefore, from viewpoints of performance and cost, a composite membrane is desirable, in which separate raw materials bear a separation function and a function for providing the membrane with the mechanical strength. Such a composite membrane is becoming a mainstream in a reverse osmosis membrane for water treatment.

On the other hand, in the gas separation membrane, a study on composite membranes has not sufficiently been done. Further, there are also a small number of examples which provide findings, on a technique of utilizing a crosslinked-structure membrane for a separating layer that is being studied by the present inventors (see Patent Literature 3, and Non-Patent Literatures 4, 5 and 6). According to these disclosed methods, a high temperature or a long time period is required to crosslinking in some cases. Therefore, these methods have been still insufficient for providing a practical gas separation membrane excellent in membrane-forming competence, while maintaining high gas permeability and separation selectivity.

Further, in the course of carrying forward a study on a separation membrane utilizing a crosslinked polyimide resin, the present inventors have begun to find that, in view of practical requirements, it is necessary to keep high separation selectivity, under the high-pressure conditions, even in the system in which impurities, such as toluene, has been mixed in some cases.

In view of the above-described respects, the present invention is contemplated for providing: a gas separation composite membrane, which, even under the conditions of high pressure and containing plasticization-induced impurities, has excellent gas permeability and yet realizes high gas separation selectivity, and which further attains high membrane-forming competence; a method of producing the same; a gas separation module using the same; and a gas separation apparatus.

Solution to Problem

The above-described tasks can be attained by the following means.

[1] A gas separation composite membrane, containing:
a gas-permeable supporting layer; and
a gas separating layer containing a crosslinked polyimide resin, over the gas-permeable supporting layer,
wherein the crosslinked polyimide resin is composed of a polyimide compound having been crosslinked through an ester linking group,
wherein the polyimide compound contains a repeating unit represented by formula (I), a repeating unit represented by formula (II-a) or (II-b), and a repeating unit represented by formula (III-a) or (III-b), and
wherein a ratio [κ] of a site forming a crosslinked chain mediated by the ester linking group to an imide group (the number of specific crosslinkable sites/the number of imide groups) is more than 0.4 and less than 0.5:

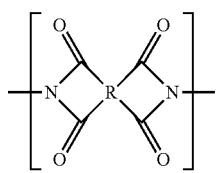

(I)

wherein, in formula (I), R is a group of atoms selected from the group consisting of groups represented by any one of formulas (I-a) to (I-g); $X^1$ represents a single bond or a divalent linking group; $Y^1$ represents a methylene group or a vinylene group; $R^1$ and $R^2$ each independently represent a hydrogen atom or a substituent; and the symbol "*" represents a binding site;

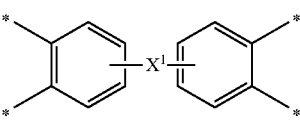

(I-a)

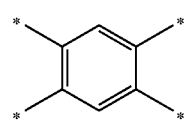

(I-b)

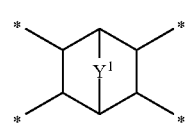

(I-c)

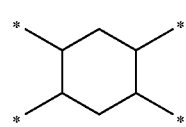

(I-d)

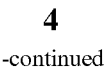

(I-e)

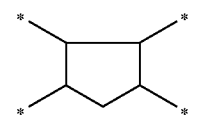

(I-f)

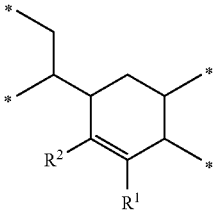

(I-g)

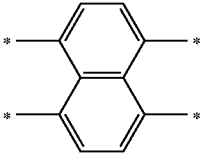

(II-a)

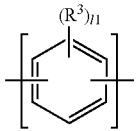

(II-b)

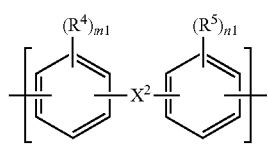

wherein, in formulas (II-a) and (II-b), $R^3$, $R^4$ and $R^5$ each independently represent a substituent; l1, m1 and n1 each independently are an integer of from 0 to 4; and $X^2$ represents a single bond or a divalent linking group; and (III-a)

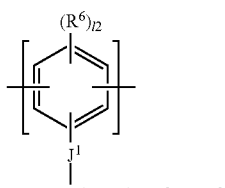

(III-b)

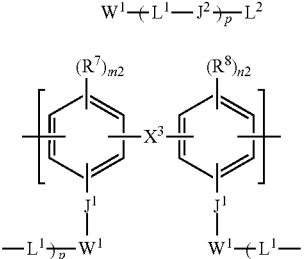

wherein, in formulas (III-a) and (III-b), $R^6$, $R^7$ and $R^8$ each independently represent a substituent; $J^1$, $J^2$ and $W^1$ each independently represent a single bond or a divalent linking group; l2, m2 and n2 each independently are an integer of from 0 to 3; $L^1$ represents a divalent linking group; $L^2$ represents a crosslinkable functional group; p represents an integer of 0 or more; $X^3$ represents a single bond or a divalent linking group; and $-J^1-W^1-(L^1-J^2)_p-L^2$ is a site for forming a crosslinked chain mediated by the ester linking group upon being crosslinked.

[2] The gas separation composite membrane as described in item [1], wherein a gas to be supplied is a mixed gas of carbon dioxide and methane, wherein a transmission rate of the carbon dioxide at 40° C. and 40 atmospheric pressure is more than 20 GPU, and wherein a ratio of the transmission rate of the carbon dioxide to a transmission rate of the methane ($R_{CO2}/R_{CH4}$) is 15 or more.

[3] The gas separation composite membrane as described in item [1] or [2], wherein the supporting layer contains a porous layer on a side of the gas separating layer and a nonwoven fabric layer on a side reverse thereto.

[4] The gas separation composite membrane as described in any one of items [1] to

[3], wherein the porous layer has a molecular weight cut-off of 100,000 or less.

[5] The gas separation composite membrane as described in any one of items [1] to [4], wherein the crosslinkable functional group $L^2$ is a functional group that is capable of forming an ester covalent bond.

[6] A method of producing the gas separation composite membrane described in any one of items [1] to [5], wherein, in formula (III-a) or (III-b), the crosslinkable functional group $L^2$ is a radical crosslinkable ester functional group, the method comprising:

applying a coating liquid containing the polyimide compound, over the supporting layer; and irradiating an active radiation or applying heat to the coating liquid, thereby subjecting the crosslinkable functional group to a reaction, to crosslink the polyimide compound.

[7] A method of producing the gas separation composite membrane described in any one of items [1] to [5], comprising:

applying a coating liquid containing both of the polyimide compound, and a compound having at least two functional groups selected from an oxirane group and an oxetane group in the molecule thereof, over the supporting layer; and irradiating an active radiation or applying heat to the coating liquid, thereby subjecting the crosslinkable functional group to a reaction, to crosslink the polyimide compound.

[8] The method of producing the gas separation composite membrane as described in item [6] or [7], wherein a crosslinking conversion ratio [α] [the crosslinked site/the crosslinkable site] is set to be 5% or more and 100% or less, in the crosslinking of the polyimide compound.

[9] The method of producing the gas separation composite membrane as described in any one of items [6] to [8], wherein the crosslinking of the polyimide compound is carried out under the conditions of 10 to 120° C.

[10] A gas separation module, containing the gas separation composite membrane as described in any one of items [1] to [5].

[11] A gas separation apparatus, containing the gas separation module as described in item [10].

[12] A gas separation method, which comprises: a step of selectively permeating carbon dioxide from a gas containing carbon dioxide and methane, by using the gas separation composite membrane as described in any one of items [1] to [5].

When a plurality of substituents, linking groups, or the like (hereinafter, referred to as "substituent or the like") represented by a specific symbol are described herein, or a plurality of substituents or the like are simultaneously or alternatively defined herein, respective substituents or the like may be identical to or different from each other. Moreover, unless otherwise specified, when a plurality of substituents or the like are close, they may be linked with each other or subjected to ring condensation, thereby forming a ring.

Advantageous Effects of Invention

The gas separation composite membrane of the present invention, even under the conditions of high pressure and containing plasticization-induced impurities, has excellent gas permeability, and yet exhibits high gas separation selectivity, and further realizes high membrane-forming competence. Moreover, the present invention allows providing a high-performance gas separating module and gas separation apparatus, using the gas separation composite membrane. Further, the method of producing the gas separation composite membrane according to the present invention allows production of a gas separation composite membrane that exhibits the high performance.

Other and further features and advantages of the invention will appear more fully from the following description, appropriately referring to the accompanying drawings.

BRIEF DESCRIPTION OF THE DRAWINGS

FIG. 1 is a cross section schematically illustrating one embodiment of the gas separation composite membrane according to the present invention.

FIG. 2 is a cross section schematically illustrating another embodiment of the gas separation composite membrane according to the present invention.

MODE FOR CARRYING OUT THE INVENTION

The gas separation composite membrane of the present invention has a specific structure of the crosslinked portion and a specific crosslinked site ratio. This configuration exhibits excellent advantageous effects on gas separation. The reason (mechanism of action) includes points yet unknown, but is estimated as described below.

First, when the gas separating mechanism by the membrane is examined, when a gas molecule permeates a thin film, consideration is made to a role of a Knudsen mechanism or a Hagen-Poiseuille mechanism (porous membrane), a surface diffusion mechanism (porous membrane), a molecular sieve mechanism (porous membrane), a dissolution and diffusion mechanism (nonporous membrane) or the like (see "Shintei Saishin Polyimide—Kiso to Oyo—," 365 to 376, edited by Nihon Polyimide Hokozokukei Kobunshi Kenkyukai). Here, when separation of $CO_2$ and $CH_4$ is referred to, both are a low-molecular-weight compound, and molecular sizes to be separated are approximated. In such a case, control of the above-described dissolution and diffusion mechanism becomes important (see "Kitaibunrimaku, Tokamaku, Bariamaku no Saishingijyutsu," pp. 52-59, compiled under the supervision by Kazukiyo Nagai, CMC Publishing). Therefore, in order to selectively improve permeability (permeability coefficient) of carbon dioxide to a gas to be separated, a solubility coefficient (solubility) and/or a diffusion coefficient (diffusibility) of carbon dioxide to a polymer membrane only needs to be selectively improved.

In contrast, according to the present invention, in the crosslinked polyimide high in the glass transition temperature, a crosslinkable site ratio [K] is set to a suitable range and polymer chains of the polyimide are linked with one another via a specific crosslinked chain mediated by an ester group. Therefore, it is believed that the crosslinked form is made into a favorite one, and that further in combination with solubility and diffuseness due to the polyimide compound, characteristic diffusion selectivity (high-gas selectivity) has been exhibited, even under the conditions of high pressure up to 40 atmospheres. Moreover, a uniform and degradation-free crosslinked form is realized in the membrane, which is considered to have good bending property and deterioration resistance, to be adapted for a thin supporting layer, and to develop excellent production competence. Hereinafter, the present invention is described in detail.

[Composite Membrane]

The composite membrane according to the present invention has the gas separating layer containing the crosslinked polyimide resin formed, over the gas-permeable supporting layer. This composite membrane is preferably formed by applying a coating liquid (dope) to form the above-described gas separating layer (herein "applying" means to include an embodiment in which the coating liquid is attached on the surface by dipping) at least on the surface of a porous support, and irradiating the resultant coated surface with active radiation. FIG. 1 is a cross-sectional view schematically showing a gas separation composite membrane 10, being a preferred embodiment according to the present invention. The reference sign 1 is a gas separating layer and the reference sign 2 is a supporting layer constituted of a porous layer. FIG. 2 is a cross-sectional view schematically showing a gas separation composite membrane 20, being another preferred embodiment according to the present invention. According to this embodiment, in addition to the gas separating layer 1 and the porous layer 2, a nonwoven fabric layer 3 is added as the supporting layer.

An expression "over the supporting layer" means that any other layer may be interposed between the supporting layer and the gas separating layer. In addition, unless otherwise specified, with regard to expressions "over" and "under", a direction in which a gas to be separated is supplied is referred to as "over", and a direction from which a separated gas is discharged is referred to "under".

The gas separation composite membrane according to the present invention may have the gas separating layer formed and arranged on the surface or inside of the porous support. The gas separating layer is formed at least on the surface, and thus the composite membrane can be simply realized. Formation of the gas separating layer at least on the surface of the porous support allows realization of a composite membrane having advantages of high separation selectivity, high gas permeability, and also mechanical strength. Regarding the membrane thickness of the separating layer, the membrane is preferably as thin as possible under conditions to provide high gas permeability while maintaining mechanical strength and separation selectivity.

The thickness of the gas separating layer of the gas separation composite membrane according to the present invention is not particularly limited, but is preferably from 0.01 to 5.0 µm, and more preferably from 0.05 to 1.0 µm.

The porous support preferably applied for the support layer is not particularly limited so long as it satisfies for providing mechanical strength and high gas permeability, and it may be a porous membrane made of any organic or inorganic substance. The porous support is preferably an organic polymer porous membrane. The thickness thereof is preferably from 1 to 3,000 µm, more preferably from 5 to 500 µm, and further preferably from 5 to 150 µm. Regarding this fine-pore structure of the porous membrane, a mean pore diameter is generally 10 µm or less, preferably 0.5 µm or less, and more preferably 0.2 µm or less, and a porosity is preferably from 20 to 90%, and more preferably from 30 to 80%. In addition, the gas permeability is preferably $3 \times 10^{-5}$ cm$^3$ (STP)/cm$^2 \cdot$sec$\cdot$cmHg or more, based on carbon dioxide permeation rate. Examples of the material for the porous membrane include conventionally known polymers: including polyolefin-based resins, such as polyethylene, and polypropylene; fluorine-containing resins, such as polytetrafluoroethylene, polyvinyl fluoride, and polyvinylidene fluoride; and various resins, such as polystyrene, cellulose acetate, polyurethane, polyacrylonitrile, polyphenyleneoxide, polysulfone, polyethersulfone, polyimide, and polyaramide. Above all, from viewpoints of excellent production competence upon coating the polyimide compound to perform crosslinking, and attaining both of high gas permeability and separation selectivity, the supporting layer is preferably constituted of polyacrylonitrile, polysulfone, or polyphenylene oxide, and further preferably of polyacrylonitrile. The shape of the porous membrane may be any of plate, spiral, tubular, or hollow fibers.

In the present invention, application of the supporting layer forming the gas separating layer is to be essentially required. As mentioned above, this supporting layer being a thin and porous raw material is preferred due to capability of securing sufficient gas permeability. Moreover, the supporting layer is preferably in a thin membrane and porous form, also for sufficiently getting excellent gas separation selectivity of the gas separating layer as mentioned later. On the one hand, when severe reaction conditions, such as a high temperature and long time period, are imposed on shaping of the gas separation membrane, the conditions may occasionally damage the above-mentioned thin and porous supporting layer not to allow development of sufficient performance as the composite membrane. From such a viewpoint, the gas separation composite membrane using the radically crosslinkable polyimide compound employed in the present invention can be formed under mild conditions, exhibit an excellent advantageous effect, and develop high performance in both of production competence and product quality.

In the present invention, in order to further provide the membrane with mechanical strength, a support is preferably formed in a lower part of the supporting layer for forming the gas separating layer. Examples of such a support include a woven fabric, a nonwoven fabric, and a net, and a nonwoven fabric is preferably used in view of membrane-forming property and cost. As the nonwoven fabric, fibers formed of polyester, polypropylene, polyacrylonitrile, polyethylene, polyamide, or the like may be used alone or in combination of a plurality of fibers. The nonwoven fabric can be produced, for example, by paper making of main fibers and binder fibers that are uniformly dispersed in water, using a cylinder mold, a fourdrinier, or the like, followed by drying the resultant product by a drier. Moreover, the nonwoven fabric is preferably interposed between two rolls and subjected to pressure heating processing, for the purpose of removing fluff or improving mechanical properties.

The gas separating composite membrane according to the present invention can be preferably used in a gas separation recovery method or a gas separation purification method. For example, the gas separating composite membrane can efficiently separate a specific gas from a gaseous mixture containing: hydrogen, helium, carbon monoxide, carbon dioxide, hydrogen sulfide, oxygen, nitrogen, ammonia, sulfur oxide, nitrogen oxide; a hydrocarbon, such as methane, and ethane; an unsaturated hydrocarbon; such as propylene; or a gas of a perfluorocompound, such as tetrafluoroethane. In particular, the gas separating composite membrane is preferably for selectively separating carbon dioxide from a gaseous mixture containing carbon dioxide/hydrocarbon (methane), and is preferably applied to the method of producing the same, and is preferably assembled into a module or a separation apparatus using the same.

Above all, a gas to be supplied is preferably a mixed gas of mainly carbon dioxide and methane, a transmission rate of carbon dioxide at 40° C. and 40 atmospheric pressure is preferably more than 20 GPU, more preferably from 20 to 300 GPU. A ratio of transmission rates ($R_{CO_2}/R_{CH_4}$) of carbon dioxide and methane is preferably 15 or more, more preferably 20 or more, and particularly preferably from 20 to 50.

To the above-described selective gas permeation, consideration is made to the role of the dissolution (solubility) and diffusion mechanism to the membrane as mentioned above. Study has been made for a separation membrane containing a polyethyleneoxy (PEO) composition, by taking an advantage of such a viewpoint (see Journal of Membrane Science, 1999, 160, 87-99). This results from strong interaction of carbon dioxide with the polyethyleneoxy composition. This polyethyleneoxy membrane is a flexible and rubbery polymer membrane low in glass transition temperature. Therefore, a difference of diffusion coefficients depending on gas species is small, and separation selectivity is mainly caused due to an effect of a difference in solubility. On the other hand, according to the present invention, a glass transition temperature of the polyimide compound used therefor is high, and while the above-described dissolution and diffusion action is developed, thermal durability of the membrane can also be significantly improved.

It is noted that, in the present specification, the representation of the "compound" (including the resin) is used in the sense that not only the compound itself, but also its salt and its ion are incorporated therein. Further, it is used in the sense that the compound includes a derivative thereof which is modified in a predetermined part, within the range of achieving a desired effect.

Further, in the present specification, a substituent (and also a linking group) that is not specified by substitution or non-substitution means that the substituent may have an optional substituent, within the range of achieving a desired effect. This is applied to the compound that is not specified by substitution or non-substitution.

The polyimide compound for use in the present invention is described below in detail.

The polyimide compound for use in the present invention contains a repeating unit represented by formula (I), a repeating unit represented by formula (II-a) or (II-b), and a repeating unit represented by formula (III-a) or (III-b).

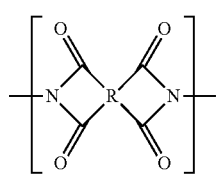
(I)

In formula (I), R is a group of atoms selected from the group consisting of groups represented by any one of formulas (I-a) to (I-g). In formula (I), the symbol "*" represents a binding site with the carbonyl group. R in formula (I) may be occasionally referred to as a scaffold. This scaffold (R) is preferably represented by formula (I-a), (I-b) or (I-c), more preferably formula (I-a) or (I-c), and particularly preferably formula (I-a).

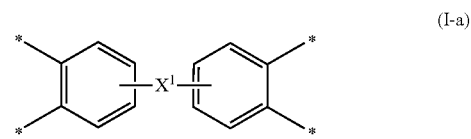
(I-a)

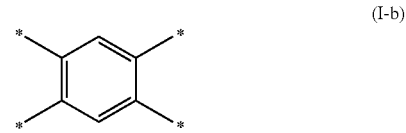
(I-b)

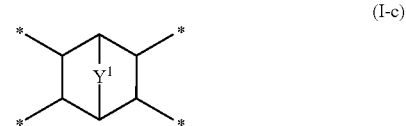
(I-c)

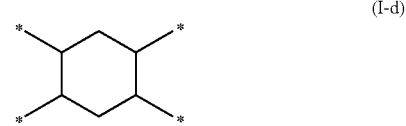
(I-d)

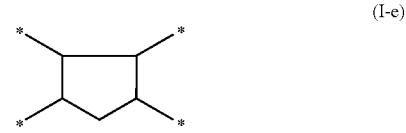
(I-e)

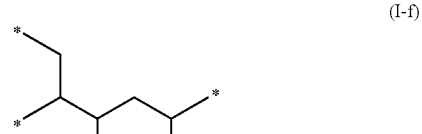
(I-f)

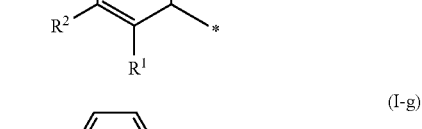
(I-g)

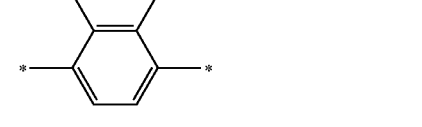

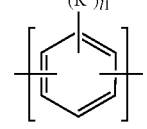
(II-a)

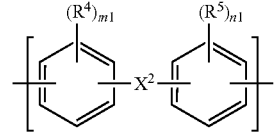
(II-b)

-continued

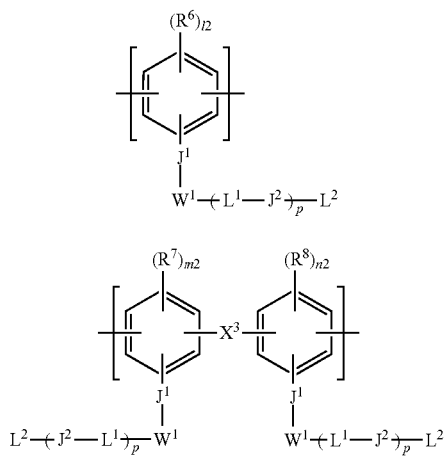

(III-a)

(III-b)

X¹, X² and X³

X¹, X², and X³ each independently represent a single bond or a divalent linking group. The divalent linking group is preferably *—$CR^F_2$—* (in which $R^F$ represents a hydrogen atom or a substituent; and when $R^F$ is a substituent, two $R^F$'s may bond with each other, to form a ring), *—O—*, *—$SO_2$—*, *—CO—*, or *—S—*; more preferably *—$CR^F_2$—*, *—O—*, *—$SO_2$—*, or *—CO—*. The symbol "*" represents a binding site with the phenylene group. Plural R's may bond with each other, to form a ring. When $R^F$ represents a substituent, examples thereof include a substituent Z described below. Especially, a halogenated alkyl group is preferred, and a fluorinated alkyl group (trifluoromethyl group, and the like) is more preferred. Moreover, when an expression "may bond with each other, to form a ring" is referred to herein, the expression may include one that is bonded by a single bond, a double bond, or the like, to form a cyclic structure, or ones that is ring condensation, to form a condensed ring structure.

Y¹

Y¹ represents a methylene group or a vinylene group, preferably a vinylene group.

R¹ and R²

R¹ and R² each independently represent a hydrogen atom or a substituent. As the substituent, any one selected from the below-mentioned substituent group Z can be applied to. On referring to the substituent herein, unless otherwise specified, the below-mentioned substituent group Z is applied to as a preferred range. R¹ and R² may bond with each other, to form a ring.

R¹ and R² each are preferably a hydrogen atom or an alkyl group; more preferably a hydrogen atom, a methyl group, or an ethyl group; and further preferably a hydrogen atom.

R³, R⁴, and R⁵

R³, R⁴, and R⁵ each independently represent a substituent. The preferred ones have the same meaning as defined with the substituent group Z. Among these, R³, R⁴, and R⁵ each are independently preferably an alkyl group (choice of preferable ones is the same as the alkyl group of the substituent group Z), or a halogen atom. Subscripts l1, m1, and n1 each representing the number of substituents described above are an integer from 0 to 4, preferably from 1 to 4, and more preferably 3 or 4. When any one of R³, R⁴, and R⁵ is more than one alkyl group, these may combine with each other, to form a ring. Any of R³ to R¹ may have additionally a substituent. The substituent is not a crosslinkable functional group which is capable of forming an ester bond, and thus the substituent has neither a carboxyl group nor a hydroxyl group.

R⁶, R⁷, and R⁸

R⁶, R⁷, and R⁸ each independently represent a substituent. The preferred ones have the same meaning as defined with the substituent group Z. Subscripts l2, m2, and n2 representing the number of substituents described above are an integer from 0 to 3, preferably from 0 to 2, and more preferably 0 or 1

J¹ and J²

J¹ and J² each independently represent a single bond or a divalent linking group. Specifically, the linking group is *—O—**, *—S—**, *—CO—**, *—C(=O)O—**, *—$CONR^9$—**, *—OC(=O)—**, *—$COO^-N^+R^{10}R^{11}R^{12}$—**, *—$SO_3^-N^+R^{13}R^{14}R^{15}$—**, a methylene group, a phenylene group, or *—$C_6H_5CO$—**. Here, the symbol "*" represents a bonding hand on a side of L¹ for J² or on a side of the phenylene group for J¹, and the symbol "**" represents a bonding hand reverse thereto. R⁹ to R¹⁵ each independently represent a hydrogen atom, an alkyl group, an aryl group, or an aralkyl group. Among these, J¹ and J² is preferably *—CO—**, *—COO—**, *—$CONR^9$—**, *—COO—**, a methylene group, a phenylene group, or *—$C_6H_4CO$—**. A preferred range of R⁹ to R¹⁵ has the same meaning as defined with the preferred range of the alkyl group or the aryl group of the substituent group Z. Among these, J' and J² each are further preferably *—CO—**, *—COO—**, or *—COO—**; and particularly preferably *—COO—**.

When the ester linking group is other than a reaction-produced site of L², it is preferred that this linking group J¹ or J² is an ester linking group (*—COO—** or *—COO—**), and especially it is more preferred that J' is an ester linking group.

W¹

W¹ represents a single bond or a divalent linking group. Examples of the divalent linking group include: linear, branched or cyclic alkylene groups (preferably alkylene groups having 1 to 30 carbon atoms, more preferably alkylene groups having 1 to 12 carbon atoms, further preferably alkylene groups having 1 to 4 carbon atoms, examples thereof include methylene, ethylene, propylene, butylene, pentylene, hexylene, octylene, decylene, and the like); alkyleneoxy groups (preferably alkyleneoxy groups having 1 to 30 carbon atoms, more preferably alkyleneoxy groups having 1 to 12 carbon atoms, further preferably alkyleneoxy groups having 1 to 4 carbon atoms, and examples thereof include methyleneoxy, ethyleneoxy, propyleneoxy, butyleneoxy, pentyleneoxy, hexyleneoxy, octyleneoxy, decyleneoxy, and the like); aralkylene groups (preferably aralkylene groups having 7 to 30 carbon atoms, more preferably aralkylene groups having 7 to 13 carbon atoms, and examples thereof include benzylidene, cinnamylidene, and the like); arylene groups (preferably arylene groups having 6 to 30 carbon atoms, more preferably arylene groups having 6 to 15 carbon atoms, and examples thereof include phenylene, cumenylene, mesitylene, tolylene, xylene, and the like), and the like. These may further have a substituent. As a further substituent, a hydroxy group or a halogen atom is preferred, a hydroxy group or a fluorine atom is more preferred, and a fluorine atom is particularly preferred. In addition, a residue of a compound having an ether bond in the molecule is also preferred.

L¹

L¹ represents a divalent linking group. Specific examples thereof include a linking group composed of a repeating unit represented by any one of (L-1) to (L-35) described below or a combination thereof. Herein, the symbol "*" of the following linking group is a bonding hand on a side of W', and the symbol "**" is a bonding hand on a side of J².
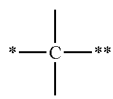 (L-1)
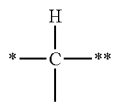 (L-2)
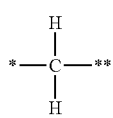 (L-3)
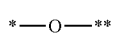 (L-4)
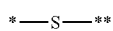 (L-5)
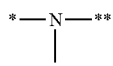 (L-6)
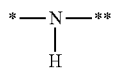 (L-7)
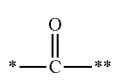 (L-8)
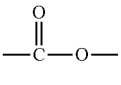 (L-9)
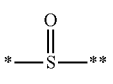 (L-10)
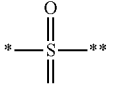 (L-11)
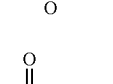 (L-12)
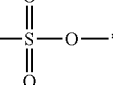 (L-13)
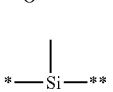 (L-14)
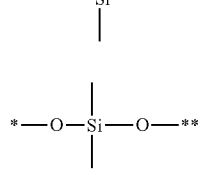 (L-15)
-continued
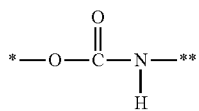 (L-16)
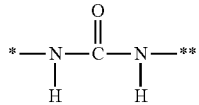 (L-17)
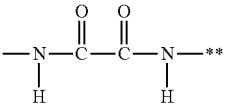 (L-18)
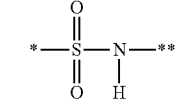 (L-19)
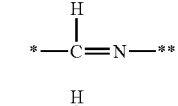 (L-20)
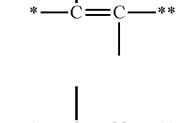 (L-21)
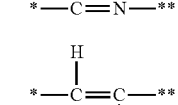 (L-22)
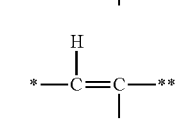 (L-23)
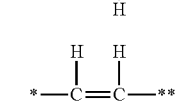 (L-24)
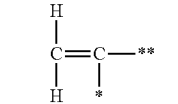 (L-25)
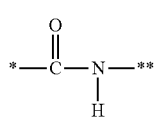 (L-26)
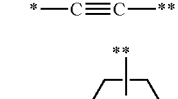 (L-27)
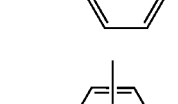 (L-28)
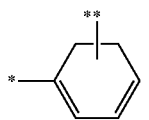 (L-29)
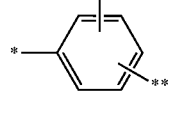 (L-30)

(L-31)
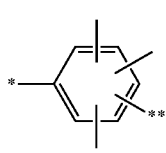

(L-32)
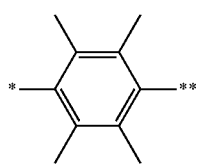

(L-33)
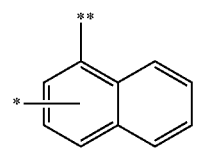

(L-34)
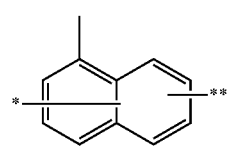

(L-35)
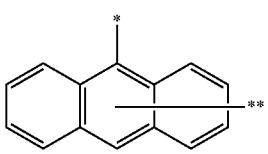

$L^1$ is preferably any one of formulas (L-1) to (L-35), an alkylene group, an alkyleneoxy group, or an arylene group; more preferably an alkylene group or an alkyleneoxy group; further preferably a residue of a compound having an ether bond in the molecule.

$L^2$ $L^2$ represents a crosslinkable functional group. Here, $-J^1-W^1-(L^1-J^2)_p-L^2$ in formula (III-a) or (III-b) constitutes a crosslinkable site that forms a crosslinked chain mediated by the ester linking group. In the case where this ester linking group is constituted in a reaction-produced site of the functional group $L^2$, the functional group $L^2$ becomes to represent a crosslinkable functional group which is capable of forming an ester covalent bond. Specifically, examples thereof include a hydroxyl group and a carboxyl group. Alternatively, in the case where $L^2$ is a crosslinkable functional group which crosslinks other than by the ester covalent bond, it is preferred that $L^2$ represents a radical crosslinkable functional group. Examples of the radical crosslinkable functional group includes an acryloyl group ($CH_2$=CRCO—, in which R represents a hydrogen atom or an alkyl group having 1 to 4 carbon atoms. R is preferably a hydrogen atom or a methyl group), and an acryloyloxy group ($CH_2$=CRCOO—). The acryloyloxy group has an ester linking group in its structure as shown in the above-described formula, and therefore it is not a reaction-produced site, but becomes a site having an ester linking group. The foregoing functional group may be sometimes referred to as an ester functional group.

$L^2$ is preferably a hydroxyl group, a carboxyl group, or an acryloyloxy group. When $L^2$ is a hydroxyl group or a carboxyl group, a combination of this group with a crosslinking agent described below allows formation of a suitable crosslinked membrane. Further, when $L^2$ is an acryloyl group or an acryloyloxy group, a combination of this group with a suitable radical reagent allows formation of a suitable crosslinked membrane.

p p represents an integer of 0 or more, preferably an integer of from 0 to 10, and more preferably an integer of from 0 to 5. Setting p to the above-described lower limit or more allows a crosslinking reaction, and setting to the above-described upper limit or less allows suppression of lowering in permeability.

Substituent Group Z Includes:

an alkyl group (preferably an alkyl group having 1 to 30 carbon atoms, more preferably an alkyl group having 1 to 20 carbon atoms, particularly preferably an alkyl group having 1 to 10 carbon atoms, and examples thereof include methyl, ethyl, iso-propyl, tert-butyl, n-octyl, n-decyl, and n-hexadecyl), a cycloalkyl group (preferably a cycloalkyl group having 3 to 30 carbon atoms, more preferably a cycloalkyl group having 3 to 20 carbon atoms, particularly preferably a cycloalkyl group having 3 to 10 carbon atoms, and examples thereof include cyclopropyl, cyclopentyl, cyclohexyl, and the like), an alkenyl group (preferably an alkenyl group having 2 to 30 carbon atoms, more preferably an alkenyl group having 2 to 20 carbon atoms, particularly preferably an alkenyl group having 2 to 10 carbon atoms, and examples thereof include vinyl, allyl, 2-butenyl, 3-pentenyl, and the like), an alkynyl group (preferably an alkynyl group having 2 to 30 carbon atoms, more preferably an alkynyl group having 2 to 20 carbon atoms, particularly preferably an alkynyl group having 2 to 10 carbon atoms, and examples thereof include propargyl, 3-pentynyl, and the like), an aryl group (preferably an aryl group having 6 to 30 carbon atoms, more preferably an aryl group having 6 to 20 carbon atoms, particularly preferably an aryl group having 6 to 12 carbon atoms, and examples thereof include phenyl, p-methylphenyl, naphthyl, anthranyl, and the like), an amino group (preferably an amino group having 0 to 30 carbon atoms, more preferably an amino group having 0 to 20 carbon atoms, particularly preferably an amino group having 0 to 10 carbon atoms, and examples thereof include amino, methylamino, dimethylamino, diethylamino, dibenzyl amino, diphenylamino, ditolyl amino, and the like), an alkoxy group (preferably an alkoxy group having 1 to 30 carbon atoms, more preferably an alkoxy group having 1 to 20 carbon atoms, particularly preferably an alkoxy group having 1 to 10 carbon atoms, and examples thereof include methoxy, ethoxy, butoxy, 2-ethylhexyloxy, and the like), an aryloxy group (preferably an aryloxy group having 6 to 30 carbon atoms, more preferably an aryloxy group having 6 to 20 carbon atoms, particularly preferably an aryloxy group having 6 to 12 carbon atoms, and examples thereof include phenyloxy, 1-naphthyloxy, 2-naphthyloxy, and the like), a heterocyclic oxy group (preferably a heterocyclic oxy group having 1 to 30 carbon atoms, more preferably a heterocyclic oxy group having 1 to 20 carbon atoms, particularly preferably a heterocyclic oxy group having 1 to 12 carbon atoms, and examples thereof include pyridyloxy, pyrazyloxy, pyrimidyloxy, quinolyloxy, and the like), an acyl group (preferably an acyl group having 1 to 30 carbon atoms, more preferably an acyl group having 1 to 20 carbon atoms, particularly preferably an acyl group having 1 to 12 carbon atoms, and examples thereof include acetyl, benzoyl, formyl, pivaloyl, and the like), an alkoxycarbonyl group (preferably an alkoxycarbonyl group having 2 to 30 carbon atoms, more preferably an alkoxycarbonyl group having 2 to 20 carbon atoms, particularly preferably an alkoxycarbonyl group having 2 to 12 carbon atoms, and examples thereof include methoxycarbonyl, ethoxycarbonyl, and the like), an aryloxycarbonyl group (preferably an aryloxycarbonyl group having 7 to 30 carbon atoms, more preferably an aryloxycarbonyl group having 7 to 20 carbon atoms, particularly preferably an aryloxycarbonyl group having 7 to 12 carbon atoms, and examples thereof include phenyloxycarbonyl, and the like), an acyloxy group (preferably an acyloxy group having 2 to 30 carbon atoms, more preferably an acyloxy group having 2 to 20 carbon atoms, particularly preferably an acyloxy group having 2 to 10 carbon atoms, and examples thereof include acetoxy, benzoyloxy, and the like), an acylamino group (preferably an acylamino group having 2 to 30 carbon atoms, more preferably an acylamino group having 2 to 20 carbon atoms, particularly preferably an acylamino group having 2 to 10 carbon atoms, and examples thereof include acetylamino, benzoylamino, and the like), an alkoxycarbonylamino group (preferably an alkoxycarbonylamino group having 2 to 30 carbon atoms, more preferably an alkoxycarbonylamino group having 2 to 20 carbon atoms, particularly preferably an alkoxycarbonylamino group having 2 to 12 carbon atoms, and examples thereof include methoxycarbonylamino, and the like), an aryloxycarbonylamino group (preferably an aryloxycarbonylamino group having 7 to 30 carbon atoms, more preferably an aryloxycarbonylamino group having 7 to 20 carbon atoms, particularly preferably an aryloxycarbonylamino group having 7 to 12 carbon atoms, and examples thereof include phenyloxycarbonylamino, and the like), a sulfonylamino group (preferably a sulfonylamino group having 1 to 30 carbon atoms, more preferably a sulfonylamino group having 1 to 20 carbon atoms, particularly preferably a sulfonylamino group having 1 to 12 carbon atoms, and examples thereof include methanesulfonylamino, benzenesulfonylamino, and the like), a sulfamoyl group (preferably a sulfamoyl group having 0 to 30 carbon atoms, more preferably a sulfamoyl group having 0 to 20 carbon atoms, particularly preferably a sulfamoyl group having 0 to 12 carbon atoms, and examples thereof include sulfamoyl, methylsulfamoyl, dimethylsulfamoyl, phenylsulfamoyl, and the like), a carbamoyl group (preferably a carbamoyl group having 1 to 30 carbon atoms, more preferably a carbamoyl group having 1 to 20 carbon atoms, particularly preferably a carbamoyl group having 1 to 12 carbon atoms, and examples thereof include carbamoyl, methylcarbamoyl, diethylcarbamoyl, phenylcarbamoyl, and the like), an alkylthio group (preferably an alkylthio group having 1 to 30 carbon atoms, more preferably an alkylthio group having 1 to 20 carbon atoms, particularly preferably an alkylthio group having 1 to 12 carbon atoms, and examples thereof include methylthio, ethylthio, and the like), an arylthio group (preferably an arylthio group having 6 to 30 carbon atoms, more preferably an arylthio group having 6 to 20 carbon atoms, particularly preferably an arylthio group having 6 to 12 carbon atoms, and examples thereof include phenylthio, and the like), a heterocyclic thio group (preferably a heterocyclic thio group having 1 to 30 carbon atoms, more preferably a heterocyclic thio group having 1 to 20 carbon atoms, particularly preferably a heterocyclic thio group having 1 to 12 carbon atoms, and examples thereof include pyridylthio, 2-benzimizolylthio, 2-benzoxazolylthio, 2-benzthiazolylthio, and the like), a sulfonyl group (preferably a sulfonyl group having 1 to 30 carbon atoms, more preferably a sulfonyl group having 1 to 20 carbon atoms, particularly preferably a sulfonyl group having 1 to 12 carbon atoms, and examples thereof include mesyl, tosyl, and the like), a sulfinyl group (preferably a sulfinyl group having 1 to 30 carbon atoms, more preferably a sulfinyl group having 1 to 20 carbon atoms, particularly preferably a sulfinyl group having 1 to 12 carbon atoms, and examples thereof include methanesulfinyl, benzenesulfinyl, and the like), a ureido group (preferably a ureido group having 1 to 30 carbon atoms, more preferably a ureido group having 1 to 20 carbon atoms, particularly preferably a ureido group having 1 to 12 carbon atoms, and examples thereof include ureido, methylureido, phenylureido, and the like), a phosphoric acid amide group (preferably a phosphoric acid amide group having 1 to 30 carbon atoms, more preferably a phosphoric acid amide group having 1 to 20 carbon atoms, particularly preferably a phosphoric acid amide group having 1 to 12 carbon atoms, and examples thereof include diethylphosphoric acid amide, phenylphosphoric acid amide, and the like), a hydroxyl group, a mercapto group, a halogen atom (for example, a fluorine atom, a chlorine atom, a bromine atom, and an iodine atom; more preferably a fluorine atom), a cyano group, a sulfo group, a carboxyl group, an oxo group, a nitro group, a hydroxamic acid group, a sulfino group, a hydrazino group, an imino group, a heterocyclic group (preferably a heterocyclic group having 1 to 30 carbon atoms, more preferably a heterocyclic group having 1 to 12 carbon atoms, examples of a hetero atom constituting the heterocyclic group include a nitrogen atom, an oxygen atom, and a sulfur atom, and specific examples of the heterocyclic group include imidazolyl, pyridyl, quinolyl, furyl, thienyl, piperidyl, morpholino, benzoxazolyl, benzimidazolyl, benzthiazolyl, carbazolyl, azepinyl, and the like), a silyl group (preferably a silyl group having 3 to 40 carbon atoms, more preferably a silyl group having 3 to 30 carbon atoms, particularly preferably a silyl group having 3 to 24 carbon atoms, and examples thereof include trimethylsilyl, triphenylsilyl, and the like), a silyloxy group (preferably a silyloxy group having 3 to 40 carbon atoms, more preferably a silyloxy group having 3 to 30 carbon atoms, particularly preferably a silyloxy group having 3 to 24 carbon atoms, and examples thereof include trimethylsilyloxy, triphenylsilyloxy, and the like) and the like. Any of these substituents may be further substituted by one or more substituents selected from the substituent group Z.

Herein, in the present invention, when one structural site has a plurality of substituents, those substituents may be linked with each other, to form a ring; or alternatively may be ring condensed partially or entirely with the structural site, to form an aromatic ring or an unsaturated heterocycle.

The polyimide can be synthesized by condensation polymerization of an acid anhydride with a diamine. As a synthetic method, a method described in a general book (for example, Saishin Polyimide -Kiso to Oyo-, pp. 3-49, edited by Yoshio Imai and Rikio Yokota, issued by NTS Publishing Co. Ltd.) can be appropriately selected. Specific examples of general acid anhydride that can be used in the present invention are shown below.

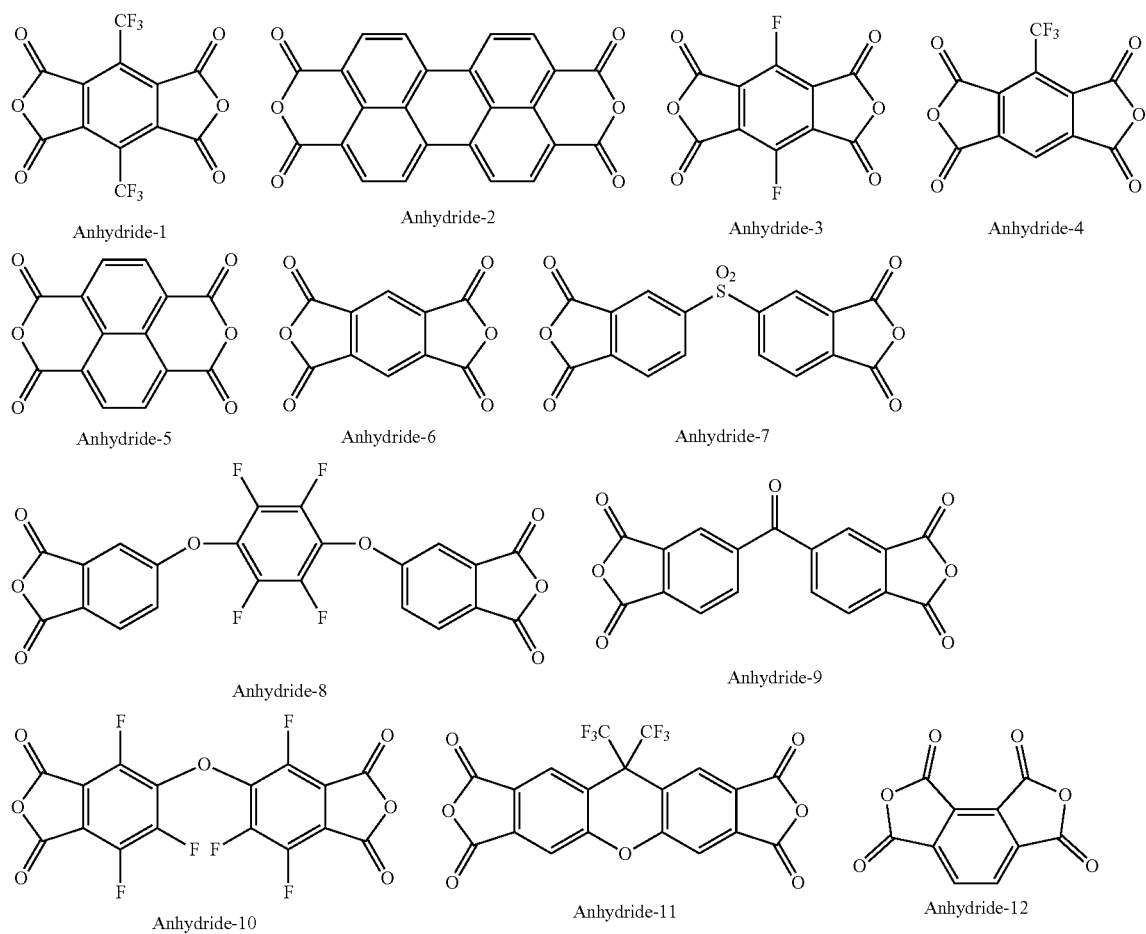
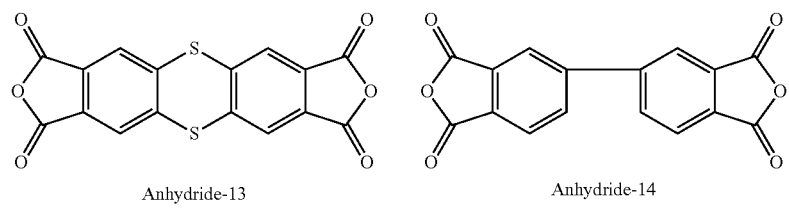
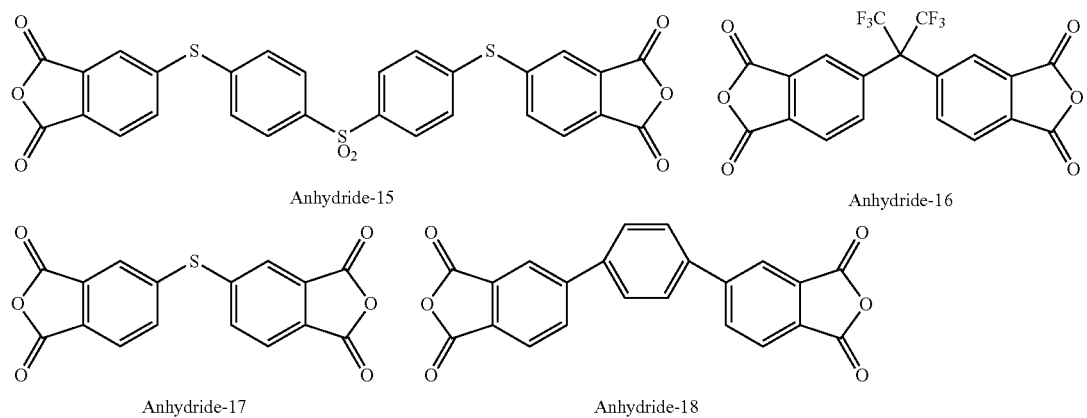

-continued
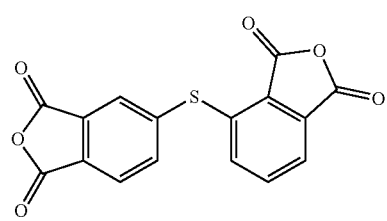
Anhydride-19
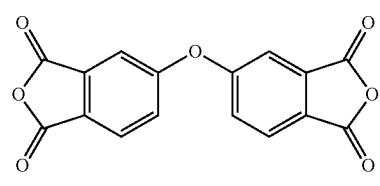
Anhydride-20
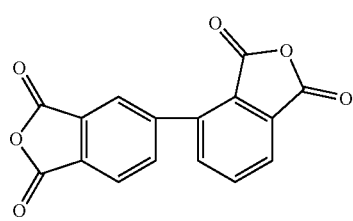
Anhydride-21
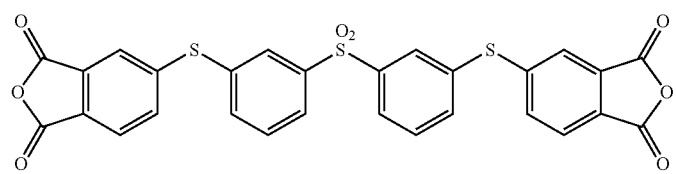
Anhydride-22
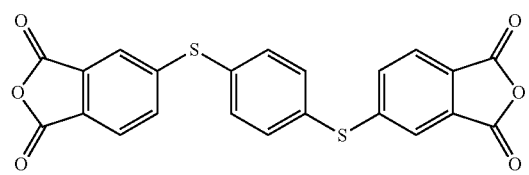
Anhydride-23
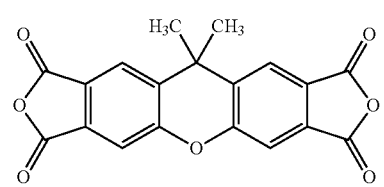
Anhydride-24
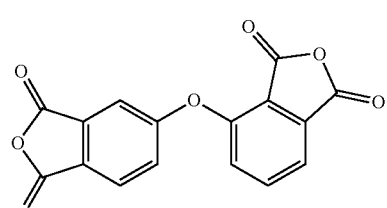
Anhydride-25
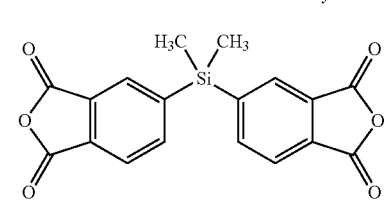
Anhydride-26
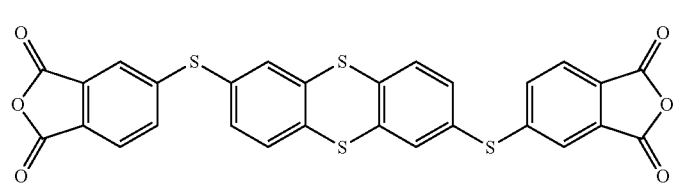
Anhydride-27
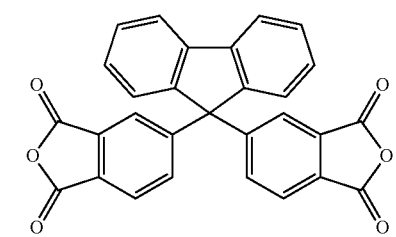
Anhydride-28
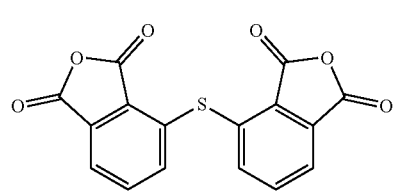
Anhydride-29
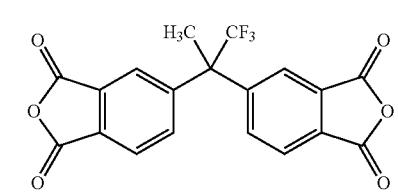
Anhydride-30
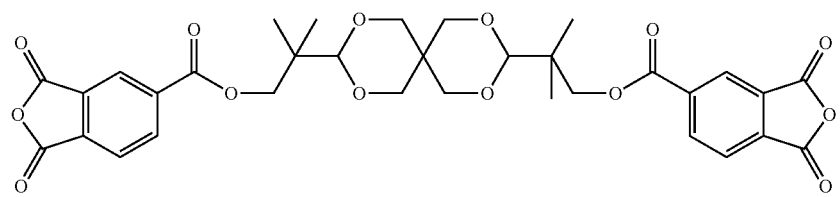
Anhydride-31

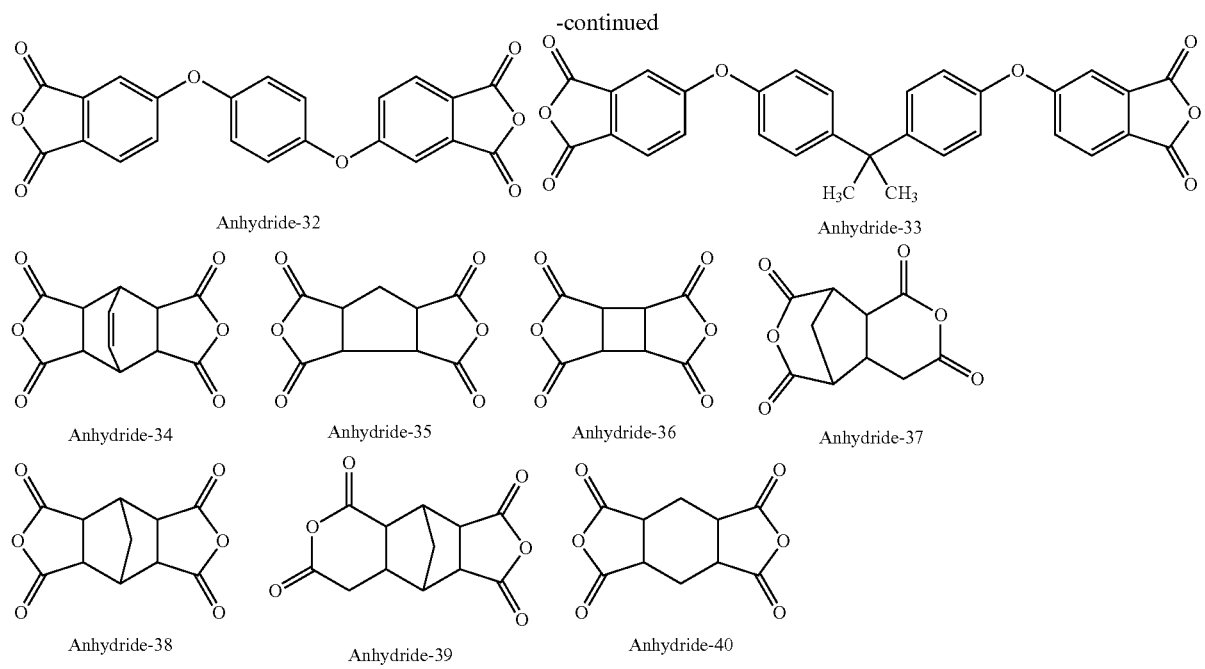
Further, specific examples of general diamine are shown below.
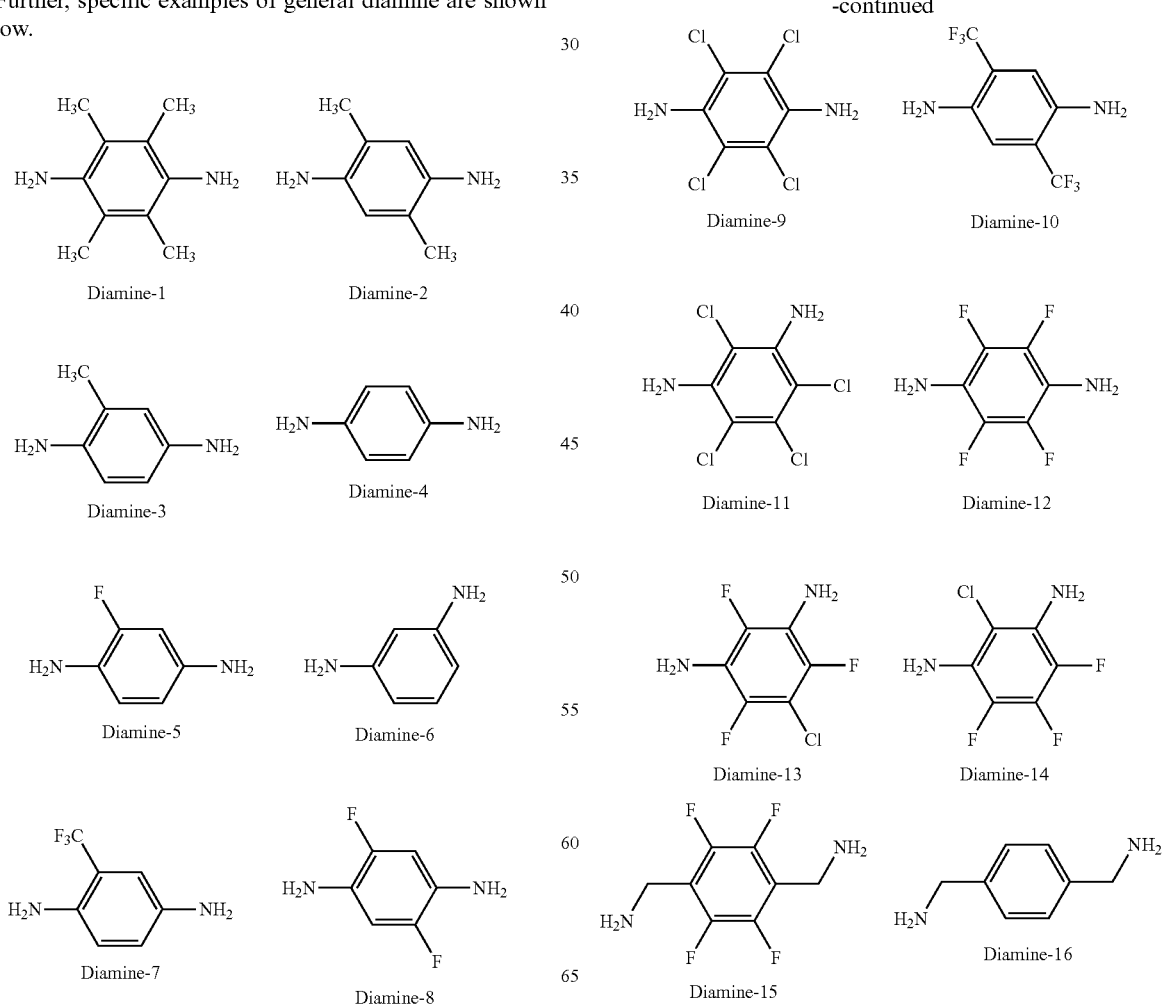

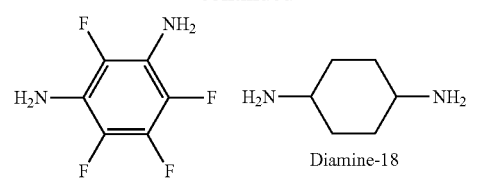
Diamine-17  Diamine-18
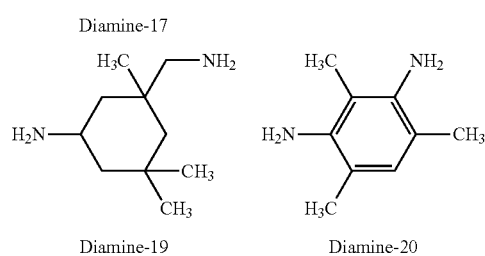
Diamine-19  Diamine-20
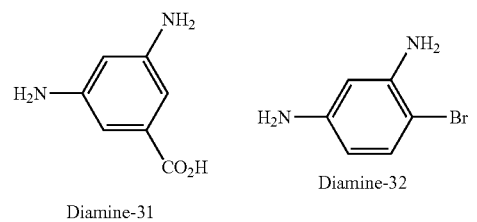
Diamine-31  Diamine-32
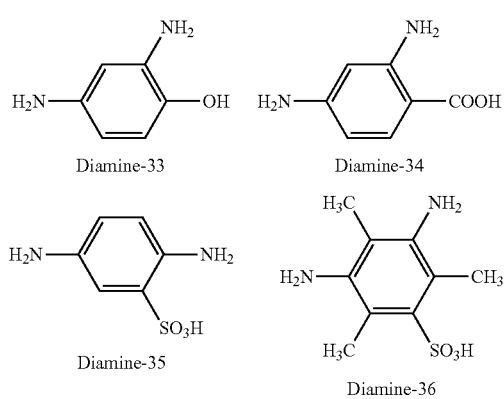
Diamine-33  Diamine-34
Diamine-35  Diamine-36
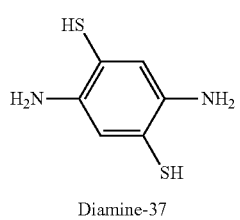
Diamine-37
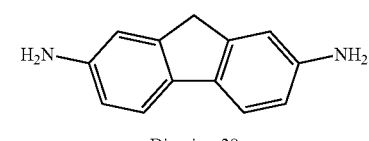
Diamine-38
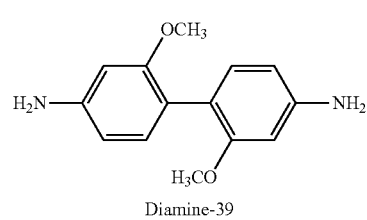
Diamine-39
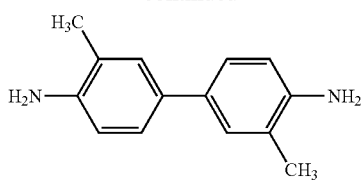
Diamine-40
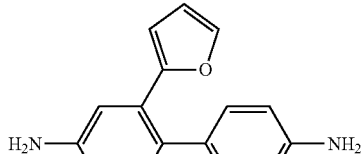
Diamine-41
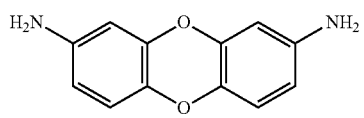
Diamine-42
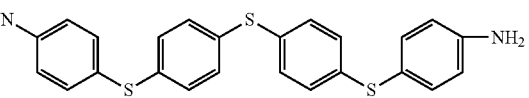
Diamine-43
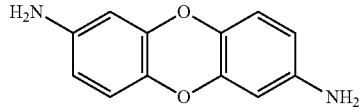
Diamine-44
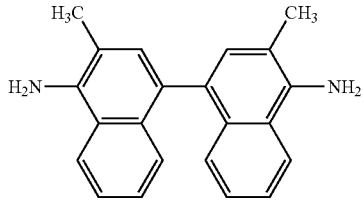
Diamine-45
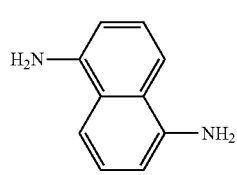
Diamine-46
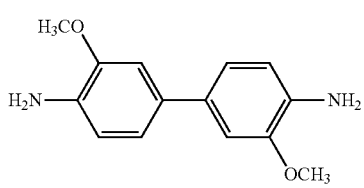
Diamine-47

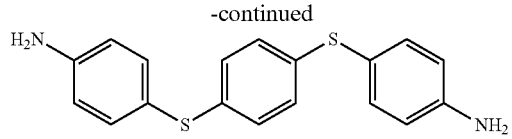
Diamine-48
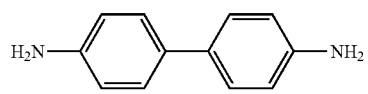
Diamine-49
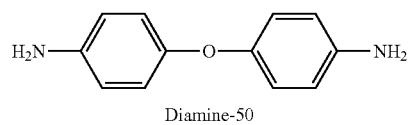
Diamine-50
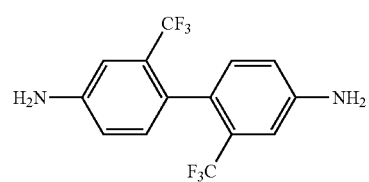
Diamine-51
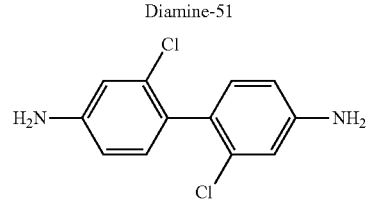
Diamine-52
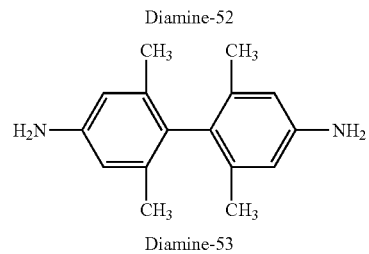
Diamine-53
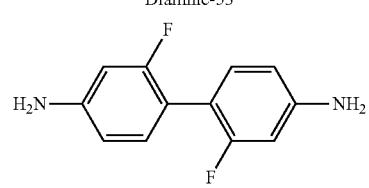
Diamine-54
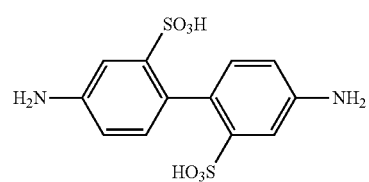
Diamine-55
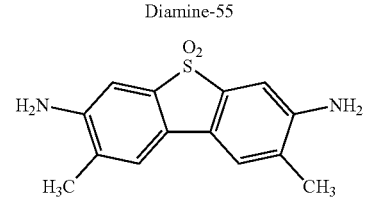
Diamine-56
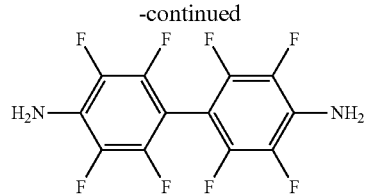
Diamine-57
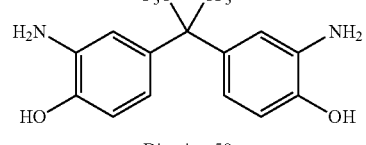
Diamine-58
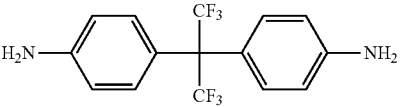
Diamine-59
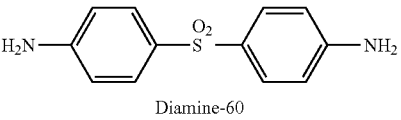
Diamine-60
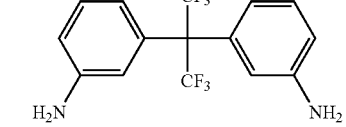
Diamine-61
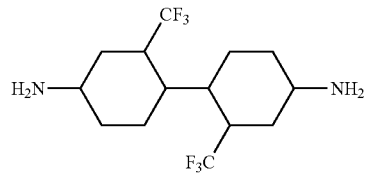
Diamine-62
Diamine-63
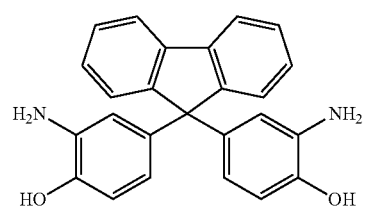
Diamine-64
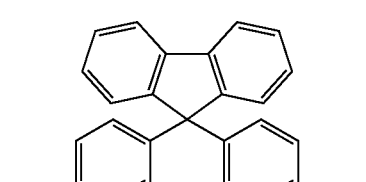
Diamine-65

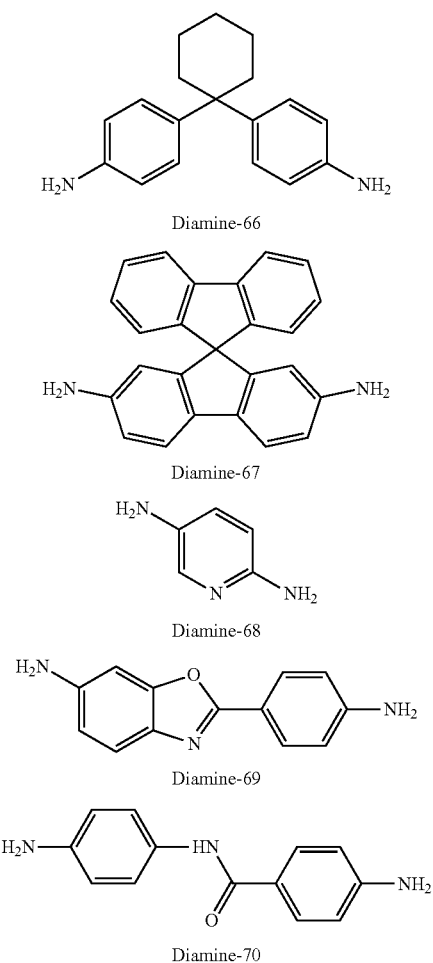
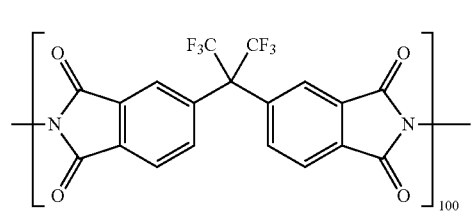
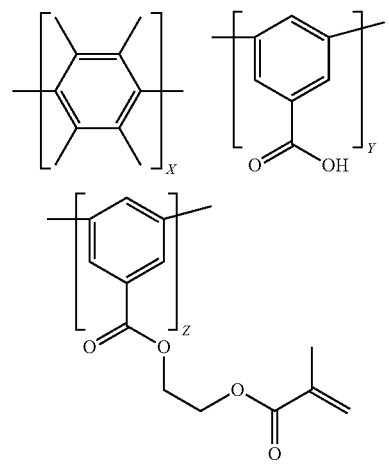
Preferred specific examples of the polyimide compound are shown below, but the present invention is not limited thereto. Upon obtaining the crosslinked membrane for use in the present invention, these polymers may be used alone or in combination with the below-mentioned crosslinking agent.
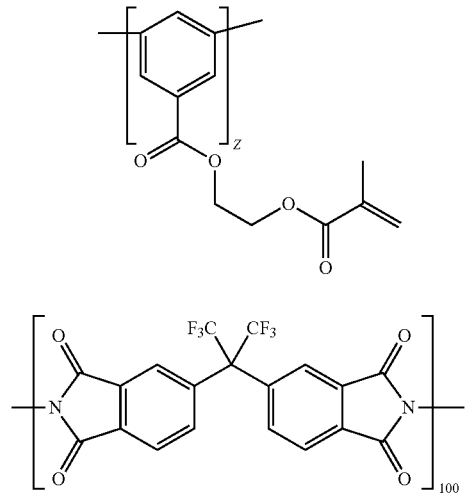
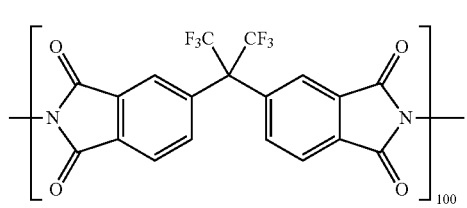
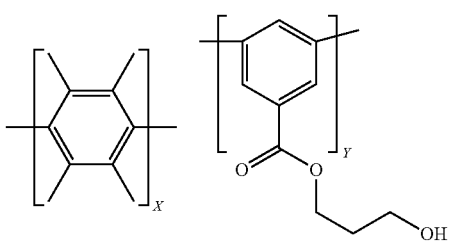
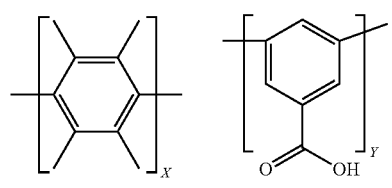
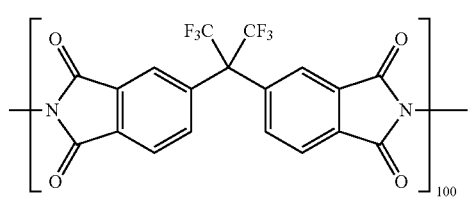
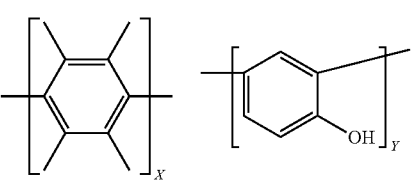

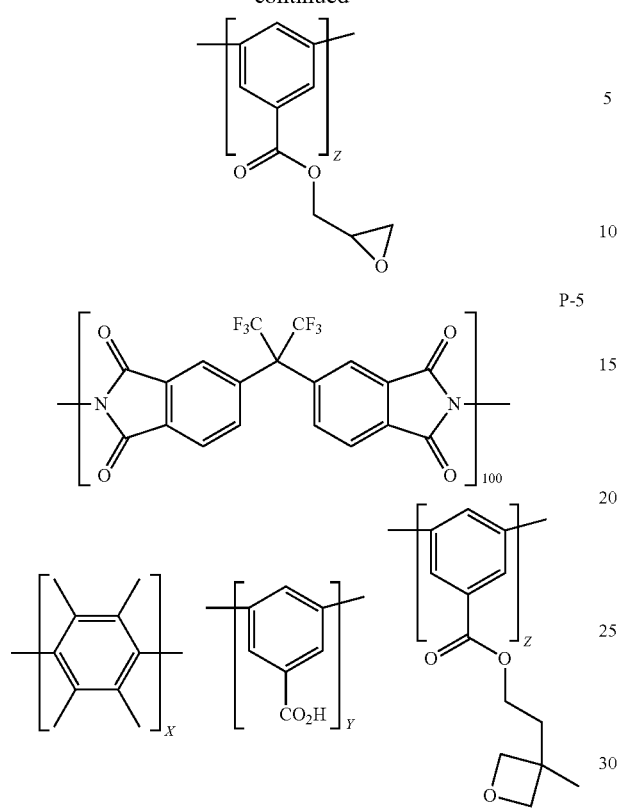
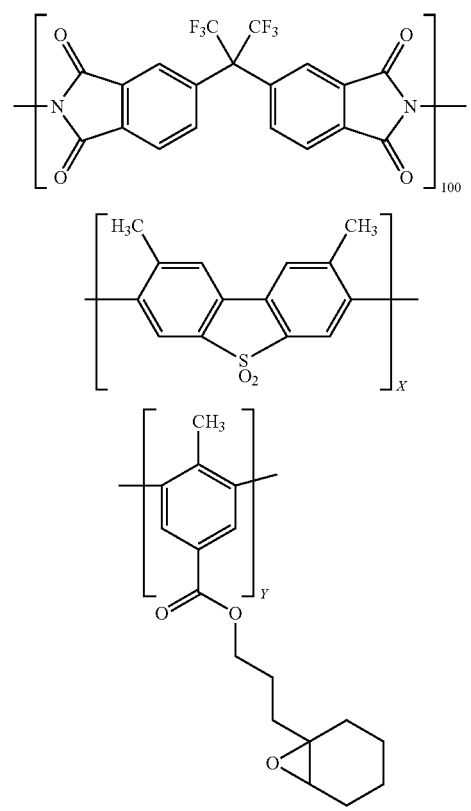
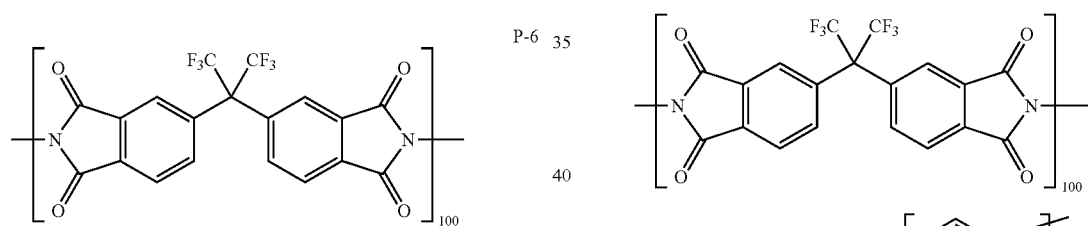
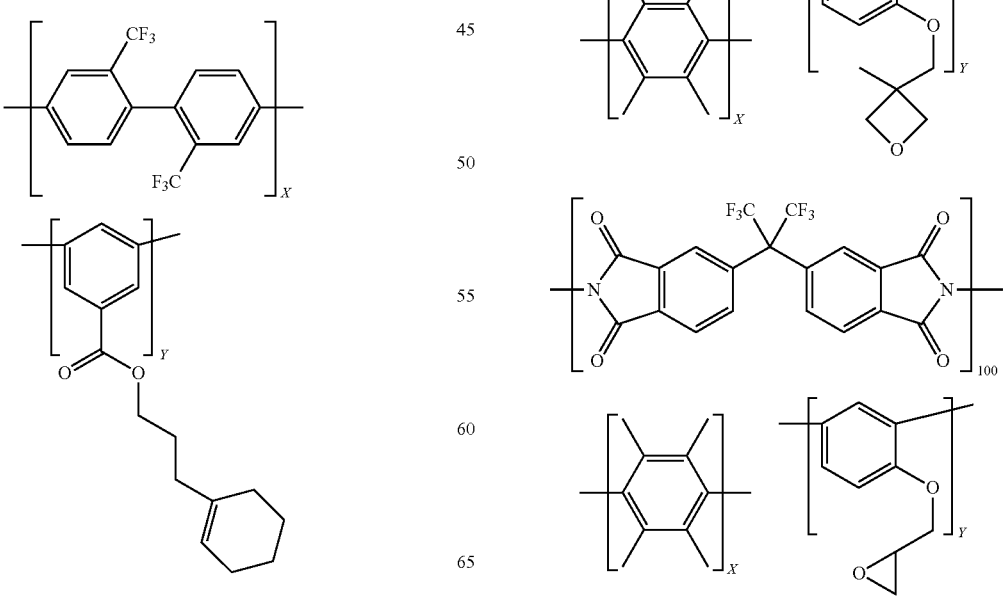

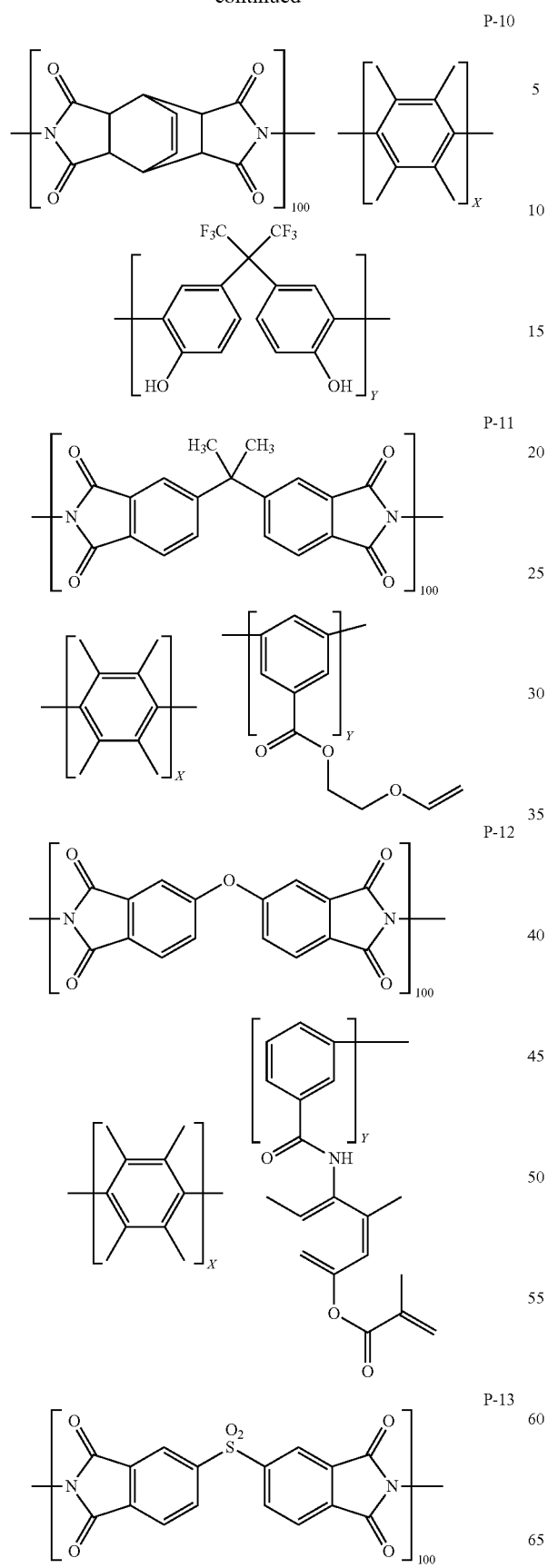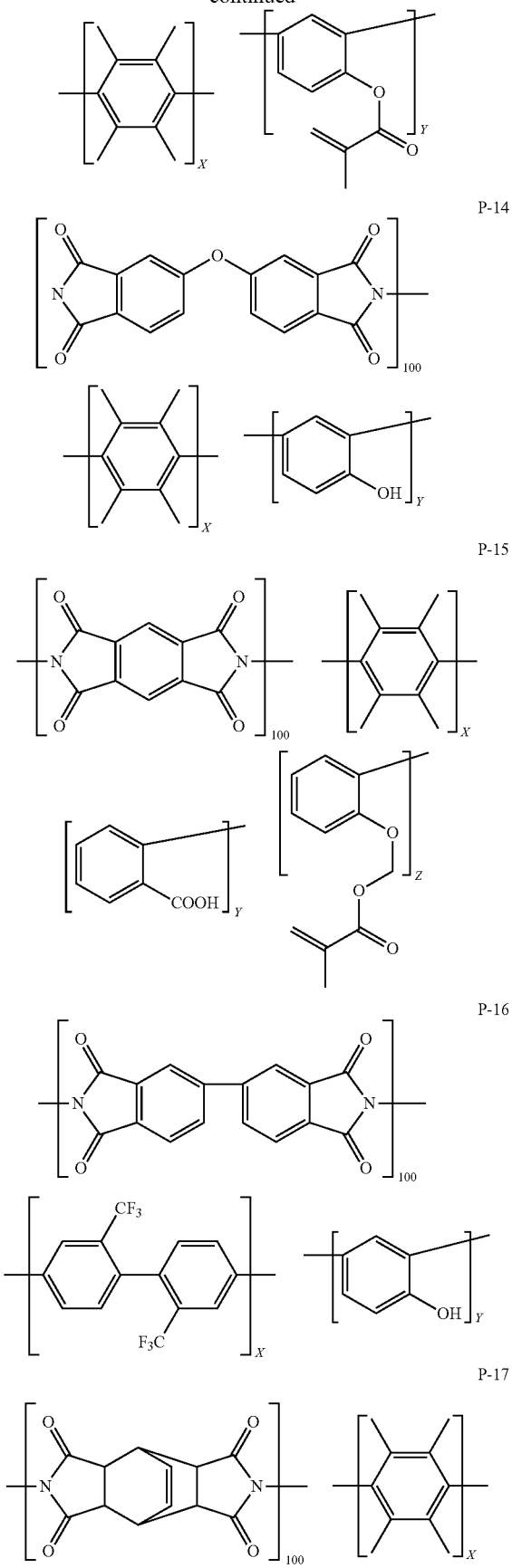

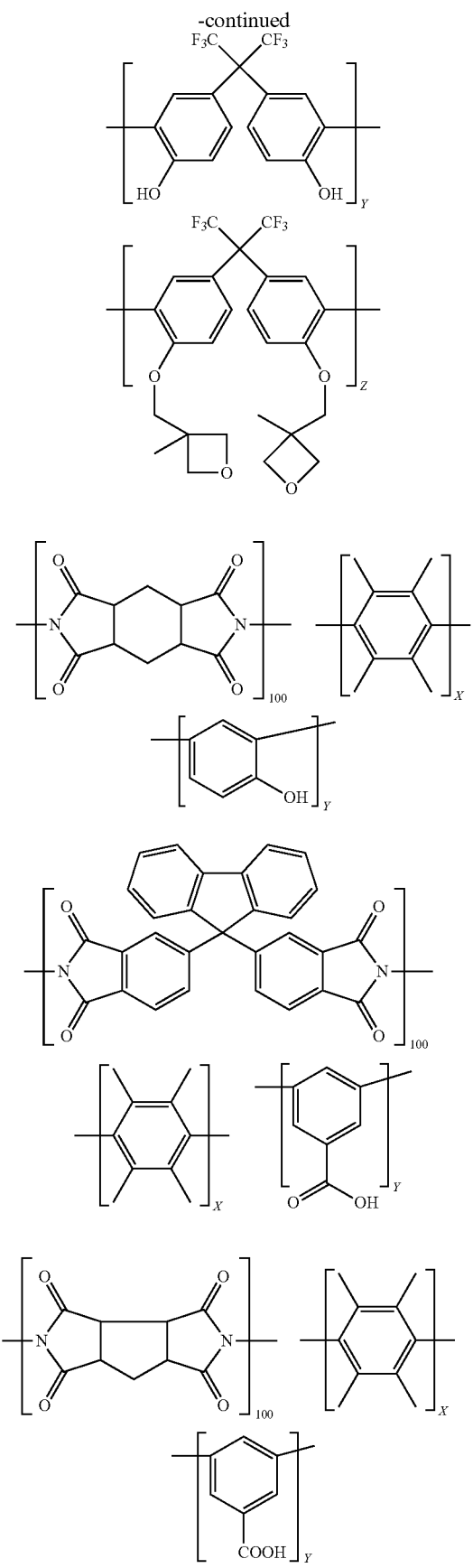

TABLE A

| | Average molecular weight | Crosslinkable site (mol %) | Ratio of crosslinkable site (κ) | [Ratio of x/y/z] | | |
|---|---|---|---|---|---|---|
| | | | | x | y | z |
| P-1 | 98,000 | 90 | 0.45 | 10 | 90 | — |
| P-2 | 113,000 | 90 | 0.45 | 10 | 80 | 10 |
| P-3 | 83,000 | 85 | 0.425 | 15 | 85 | — |
| P-4 | 70,000 | 90 | 0.45 | 10 | 70 | 20 |
| P-5 | 64,000 | 90 | 0.45 | 10 | 70 | 20 |
| P-6 | 56,000 | 85 | 0.425 | 15 | 85 | — |
| P-7 | 102,000 | 85 | 0.425 | 15 | 85 | — |
| P-8 | 94,000 | 85 | 0.425 | 15 | 85 | — |
| P-9 | 65,000 | 85 | 0.425 | 15 | 85 | — |
| P-10 | 120,000 | 90 | 0.45 | 55 | 45 | — |
| P-11 | 96,000 | 97 | 0.485 | 3 | 97 | — |
| P-12 | 112,000 | 84 | 0.42 | 16 | 84 | — |
| P-13 | 86,000 | 85 | 0.425 | 15 | 85 | — |
| P-14 | 64,000 | 95 | 0.475 | 5 | 95 | — |
| P-15 | 95,000 | 90 | 0.45 | 10 | 40 | 50 |
| P-16 | 152,000 | 97 | 0.475 | 3 | 97 | — |
| P-17 | 143,000 | 90 | 0.45 | 55 | 20 | 25 |
| P-18 | 72,000 | 90 | 0.45 | 10 | 90 | — |
| P-19 | 66,000 | 90 | 0.45 | 10 | 90 | — |
| P-20 | 73,000 | 98 | 0.49 | 2 | 98 | — |

The polymer for use in the present invention may be a copolymer with another monomers. Examples of useful another monomers include: known monomers, such as acrylates, methacrylates, acrylamides, methacrylamides, vinyl esters, styrenes, acrylic acid, methacrylic acid, acrylonitrile, maleic anhydride, and maleic imide. By copolymerizing with these monomers, various physical properties can be improved, which includes, for example, membrane-forming property, membrane strength, hydrophilicity, hydrophobicity, solubility, reactivity, and stability. The synthesis of monomers is, for example, carried out, with reference to ester synthesis of "$5^{th}$ Experiment Chemistry Lecture 16, Organic Compounds Synthesis (II-1)" or handling or purification items of monomers of "$5^{th}$ Experiment Chemistry Lecture 26, Polymer Chemistry", edited by the Japanese Chemical Society (issued by Maruzen Co. Ltd.).

As for the crosslinking agent which can be used in combination with the polymer for use in the present invention, preferred is a crosslinking agent containing at least two functional groups consisting of a hydroxyl group, an oxirane group, an oxetane group, or a combination thereof, in the molecule thereof. The number of functional groups is preferably 2 or 3, and more preferably 2. The number of carbon atoms in the crosslinking agent is not particularly limited, but is preferably from 1 to 30, and more preferably from 2 to 20. The linking group which links a plurality of crosslinkable groups is not particularly limited, but examples thereof include an alkylene group having 1 to 30 carbon atoms, a cycloalkylene group having 3 to 30 carbon atoms, a cycloalkenylene group having 2 to 30 carbon atoms, an arylene group having 6 to 30 carbon atoms, a heteroarylene group having 6 to 30 carbon atoms, or a combination thereof. Specific examples of the crosslinking agent are shown below, but the present invention is not limited thereto.

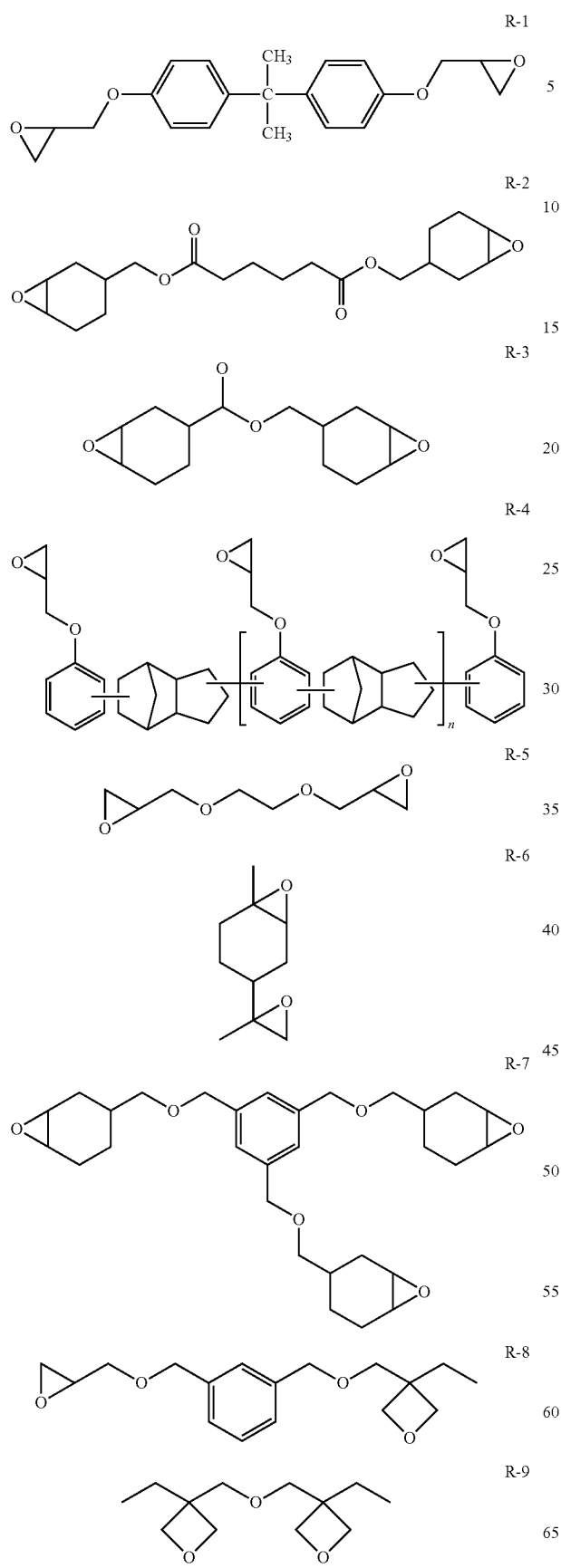
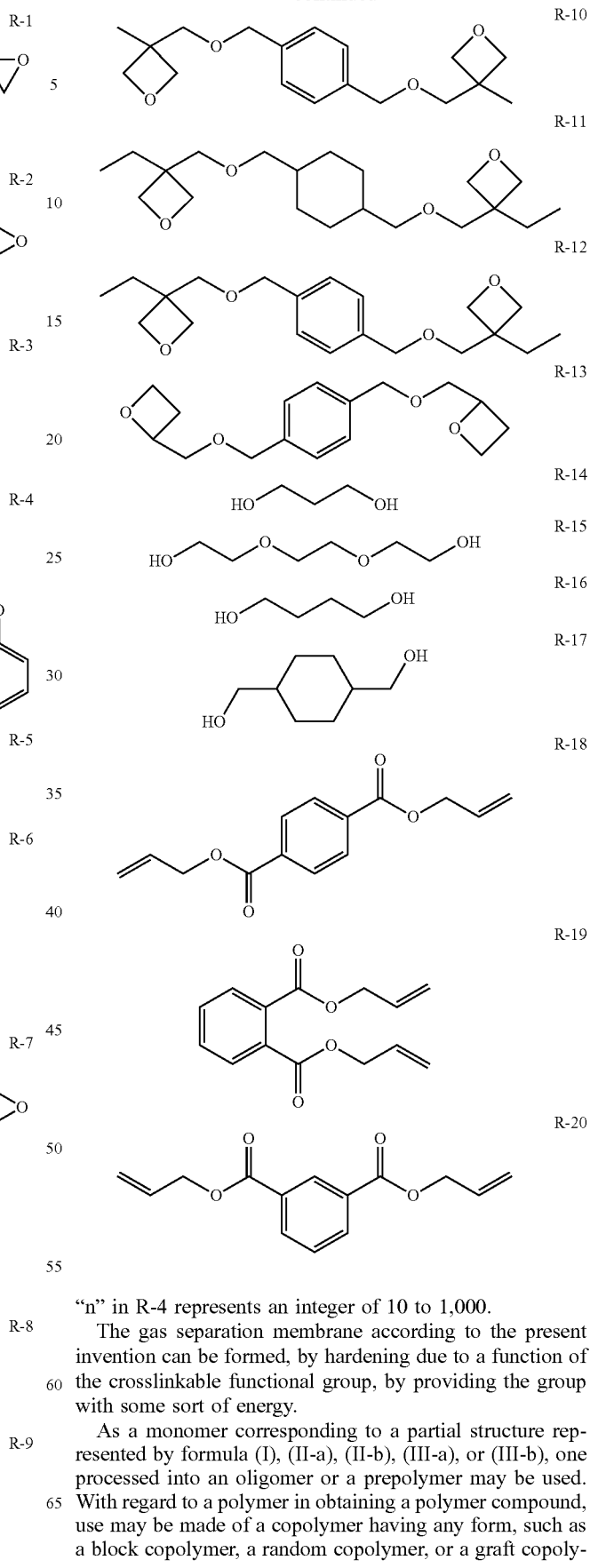

"n" in R-4 represents an integer of 10 to 1,000.

The gas separation membrane according to the present invention can be formed, by hardening due to a function of the crosslinkable functional group, by providing the group with some sort of energy.

As a monomer corresponding to a partial structure represented by formula (I), (II-a), (II-b), (III-a), or (III-b), one processed into an oligomer or a prepolymer may be used. With regard to a polymer in obtaining a polymer compound, use may be made of a copolymer having any form, such as a block copolymer, a random copolymer, or a graft copolymer. In particular, a case where a block copolymer or a graft copolymer is used is preferred, from viewpoints of viscosity and compatibility.

A ratio of the partial structure represented by formula (I), (II-a), (II-b), (III-a), or (III-b) is not particularly defined. As a composition ratio of the partial structure having a plurality of crosslinked structures increases, although an influence of molecular structure is significant, strength of the resultant membrane and separation selectivity are generally improved but gas permeability tends to decrease. Thus, as the composition ratio, the range of from 1 to 50% by mass, and preferably from 5 to 30% by mass is applied to as a criterion, respectively. However, the composition ratio is not limited to these ranges, and the composition ratio is changed, according to the purpose of gas separation (a recovery ratio, purity, or the like), and thus gas permeability and separation selectivity are adjusted.

In the present invention, a ratio of copolymerization ($R_I$) of the constitutional unit of formula (I), a ratio of copolymerization ($R_{II}$) of the constitutional unit of formulas (II-a) and (II-b), and a ratio of copolymerization ($R_{III}$) of the constitutional unit of formulas (III-a) and (III-b) are not particularly limited, but they are preferably in the relationships as described below.

|  | Preferred range | More preferred range | Particularly preferred range |
|---|---|---|---|
| $R_{II}$ | from 0.1 to 19.9 mol % | from 1.0 to 19.9 mol % | from 5.0 to 19.9 mol % |
| $R_{III}$ | from 5.0 to 80.1 mol % | from 5.0 to 50 mol % | from 5.0 to 30 mol % |
| $R_{IV}$* | from 0 to 80.1 mol % | from 1.0 to 70 mol % | from 5.0 to 70 mol % |

Note:
$R_{IV}$ with a symbol * is a ratio of copolymerization of any other constitutional unit, provided that an expression: $R_I = R_{II} + R_{III} + R_{IV}$ should be satisfied in each preferred range of $R_I$, $R_{II}$, and $R_{IV}$.

The molecular weight of the above-described polyimide compound is not particularly limited, because of a crosslinked membrane. The molecular weight corresponding to each partial structure is preferably, as the number average molecular weight, from 1,000 to 1,000,000, more preferably from 5,000 to 500,000, and further preferably from 5,000 to 100,000.

Unless specified otherwise, the molecular weight and the degree of dispersion are defined as the values obtained by measurement in accordance with a GPC (gel permeation chromatography). The molecular weight is defined as polystyrene-converted mass-average molecular weight. The gel charged into the column to be used in the GPC method is preferably a gel having an aromatic compound as a repeating unit, and examples thereof include a gel made of styrene/divinylbenzene copolymers. The column is preferably used in the form where 2 to 6 columns are connected. Examples of a solvent that can be used include: ether-based solvents, such as tetrahydrofuran; and amide-based solvents, such as N-methylpyrrolidinone. The measurement is preferably carried out at a flow rate of the solvent in the range of from 0.1 to 2 mL/min, and most preferably in the range of from 0.5 to 1.5 mL/min. By carrying out the measurement within these ranges, there is no occurrence of loading in an apparatus, and thus, the measurement can be carried out further efficiently. The measurement temperature is preferably carried out at from 10 to 50° C., and most preferably from 20 to 40° C. A column and a carrier to be used can be properly selected, according to the physical properties of a polymer compound to be measured.

[Crosslinked Polyimide Resin]

(Crosslinkable Site Ratio [κ])

In the present invention, in the crosslinked polyimide resin, a ratio [κ] (the number of specific crosslinkable sites/the number of imide groups) of the imide groups to the sites forming a crosslinked chain mediated by the ester linking group (a site having a crosslinkable functional group which is linked by the ester covalent bond, a site having a crosslinkable functional group which is capable of forming the ester covalent bond, or both of those), each of which is of the polyimide compound, is more than 0.4 and less than 0.5. The lower limit thereof is preferably 0.42 or more, and more preferably 0.43 or more. The upper limit thereof is preferably 0.49 or less, and more preferably 0.48 or less.

In the present specification, "crosslinkable site ratio [κ]" is based on the number of crosslinkable functional groups which are crosslinkable, and means a calculated value (ratio) obtained from the number of crosslinkable functional groups which has been introduced into the polyimide compound, including the number of crosslinkable functional groups which has not contributed to crosslinkage. Setting this value to more than or not less than the above-described lower limit, is preferred, because this is able to suppress effectively lowering of separation selectivity caused by plasticization of the membrane, particularly under the high-pressure conditions, due to high $CO_2$ concentration conditions or an influence of aromatic compounds, such as benzene, toluene, and xylene, or hydrocarbon impurities, such as hexane, and heptane, all of which are contained in natural gas. Setting this value to less than or not more than the above-described upper limit, allows a burden minimally reduced for thinning of the membrane to provide a practical gas permeability, thereby to allow effective suppression of lowering of gas permeability associated with an increase of the crosslink density, and also to allow enhancement of the mechanical strength against, such as cracking and brittleness, at the time of bending.

Setting this crosslinkable site ratio to a desired range can be performed by appropriately adjusting, in a synthesis of the polyimide compound, an existence ratio of the functional crosslinkable group.

(Crosslinked Structure)

In the present invention, with regard to the crosslinked polyimide resin, the crosslinked structural site preferably includes a linking group represented by —$R^{42}$COO— or —$R^{42}$OCO—(in which $R^{42}$ represents an alkyl group having 1 to 10 carbon atoms). Above all, $R^{42}$ is preferably an alkyl group having 1 to 5 carbon atoms.

Specific examples of the structure of the above-described crosslinked site in relation with the crosslinkable functional group are as described below. However, the present invention is in no way construed by being limited to these examples.

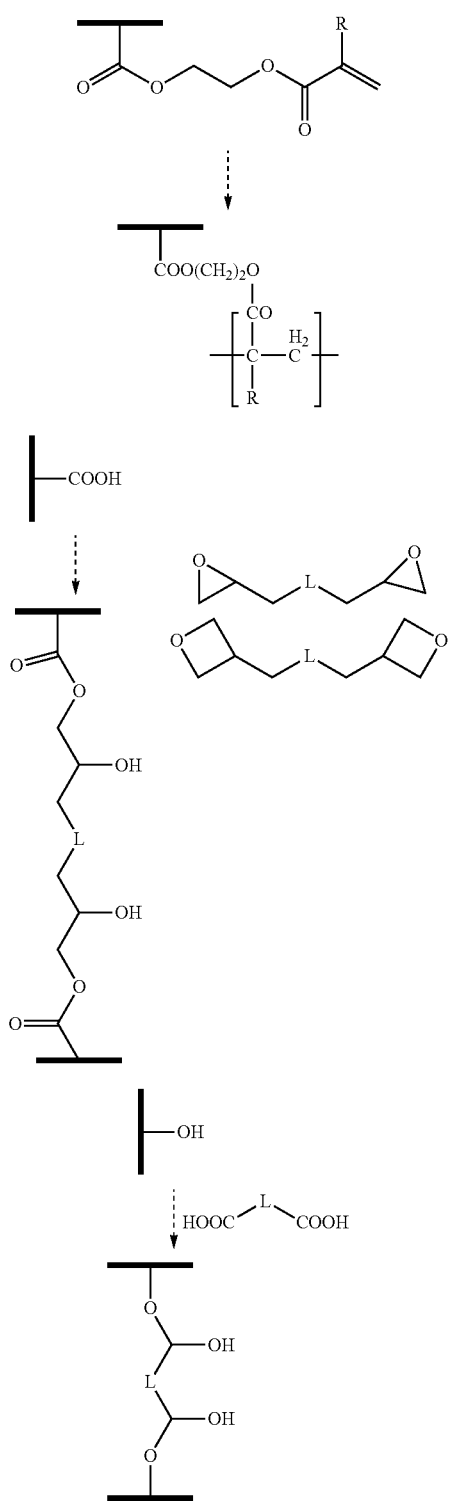

L represents a linking group.

(Crosslinking Conversion Ratio [α])

The crosslinking conversion ratio [α] in the present invention can be calculated, by a decrease of peaks of double bond sites (1640, 810 cm$^{-1}$), hydroxyl groups or carboxyl groups (3500 to 3600 cm$^{-1}$) before and after crosslinking in reflective infrared spectroscopy measurement of the membrane, and by a decrease of peaks of double bonds, hydroxyl groups or carboxyl groups before and after crosslinking in $^1$H-NMR. The crosslinking conversion ratio is preferably 20% or more and 100% or less, more preferably 30% or more and 94% or less, and further preferably 30% or more and 89% or less.

Setting this ratio to the above-described lower limit or more is preferable to allow suppression of lowering of separation selectivity, under high $CO_2$ concentration conditions, or in association with plasticizing of the membrane under the influence of an aromatic compound, such as benzene, toluene and xylene, contained in a natural gas, or hydrocarbon impurities, such as hexane and heptane, contained therein. Setting this value to not more than the above-described upper limit allows enhancement of the mechanical strength against, such as cracking and brittleness, at the time of bending, associated with an excessive enhancement of the crosslink density, and also existence of unreacted crosslinkable-functional group sites allows suppression of lowering of gas permeability.

This crosslinking conversion ratio can be adjusted by conditions of crosslinking the polyimide compound, for example, by adjusting the addition amount of the crosslinking agent, a kind of a radical polymerization initiator, a temperature in the crosslinking reaction, a substrate concentration, an amount of heat, and an amount of light and irradiation time period of active radiation. Specific examples include, in order to enhance a rate of reaction in the crosslinking reaction in radical polymerization, increasing gross energy of heat or light energy; and for a material, improving activity of a photoinitiator (e.g., a ketone-based compound) or a thermal initiator (e.g., a compound having a low decomposition temperature for an azo-based compound), each being a polymerization initiator.

[Method of Producing the Gas Separation Membrane]

The method of producing the gas separation membrane according to the present invention preferably contains: coating a coating liquid containing the above-described polyimide compound onto a support, and then irradiating the resultant coated membrane with active radiation, thereby to form the membrane. The component composition of the coating liquid (dope) for constituting the coated membrane is not particularly limited, but preferably contains the above-described polyimide compound and a polymerization initiator in an organic solvent. The content of the polyimide compound is not particularly limited, but the compound is contained in the coating liquid in an amount of preferably from 0.1 to 30% by mass, and further preferably from 0.5 to 10% by mass. Setting the content to the above-described lower limit or more causes, when the concentration is too low, a possibility is decreased in occurring a defect on a surface layer contributing to separation due to readily permeation into a lower layer, upon forming the membrane on the porous support. Setting the content to the above-described upper limit or lower allows suppression to minimize a phenomenon of thin layer formation or a decrease in permeability as caused by being packed in pores with high concentration upon forming the membrane on the porous support in the case of a too high concentration. The gas separation membrane according to the present invention can be suitably produced, by adjusting the molecular weight, the structure and the composition, of the polymer in the separating layer, and also the solution viscosity of the polymer.

Specifically, the methods of production according to two embodiments described below each are preferably used.

(1) A method of producing the gas separation composite membrane, wherein the crosslinkable functional group $L^2$ in formula (III-a) or (III-b) is a radical crosslinkable ester functional group (a functional group which is capable of forming an ester covalent bond in a resultant crosslinked chain), the method comprising: coating a coating liquid containing the polyimide compound over the supporting layer; and then irradiating an active radiation or applying heat to the coating liquid, thereby subjecting the crosslinkable functional group to a reaction, to crosslink the polyimide compound.

(2) A method of producing the gas separation composite membrane, comprising: coating a coating liquid containing both the polyimide compound and a cross-linking agent (for example, a compound having at least two functional groups selected from an oxirane group and an oxetane group, in the molecule thereof) over the supporting layer; and then irradiating an active radiation or applying heat to the coating liquid, thereby subjecting the crosslinkable functional group to a reaction, to crosslink the polyimide compound.

[Organic Solvent]

The organic solvent to be used for a medium of the coating liquid is not particularly limited, and specific examples include: hydrocarbon-based organic solvents, such as n-hexane, and n-heptane; ester-based organic solvents, such as methyl acetate, ethyl acetate, and butyl acetate; lower alcohols, such as methanol, ethanol, n-propanol, isopropanol, n-butanol, isobutanol, and tert-butanol; aliphatic ketones, such as acetone, methyl ethyl ketone, methyl isobutyl ketone, diacetone alcohol, cyclopentanone, and cyclohexanone; ether-based organic solvents, such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl ether, tetrahydrofuran, methyl cyclopentyl ether, and dioxane; N-methylpyrrolidone, 2-pyrrolidone, dimethylformamide, dimethyl imidazolidinone, dimethyl sulfoxide, dimethyl acetamide, and the like. These organic solvents are suitably selected within the range in which the solvents do not exert a harmful influence, such as corrosion of the support, and preferably an ester-based solvent (preferably butyl acetate), an alcohol-based solvent (preferably methanol, ethanol, isopropanol, and isobutanol), aliphatic ketones (preferably methyl ethyl ketone, methyl isobutyl ketone, diacetone alcohol, cyclopentanone, and cyclohexanone) or an ether-based solvent (e.g., ethylene glycol, diethylene glycol monomethyl ether, and methyl cyclopentyl ether); and further preferably an aliphatic ketone-based solvent, an alcohol-based solvent or an ether-based solvent. These solvents may be used alone or in combination of two or more.

The gas separation membrane preferably contains the below-mentioned polymerization initiator, and is formed by hardening by irradiation with active radiation. Here, the active radiation is not particularly limited so long as it applies to the membrane energy capable of generating initiation species in the membrane composition when irradiated, and broadly includes α-ray, γ-ray, X-rays, ultraviolet rays, visible rays, electric beams, and the like. Of these, ultraviolet rays and electric beams are preferred and ultraviolet rays are particularly preferred, in terms of curing sensitivity and readily availability of apparatuses therefor.

When ultraviolet rays are used in the present invention, addition of the following photopolymerization initiator is necessary. Electric beam curing is preferred, since no polymerization initiator is necessary and a permeation depth is large. An electric beam accelerator may utilize a scanning manner, a double scanning manner, or a curtain beam manner, and is preferably a curtain beam manner capable of obtaining high power at a relatively low cost. Regarding properties of electric beams, an acceleration voltage is from 30 to 1,000 kV, preferably from 50 to 300 kV. An absorbed dose is preferably from 5 to 200 kGy (from 0.5 to 20 Mrad), more preferably from 20 to 100 kGy (from 2 to 10 Mrad). When the acceleration voltage and absorbed dose are within these ranges, a sufficient amount of energy is permeated and energy efficiency is thus good. Regarding the atmosphere, at which an electric beam is irradiated, an oxygen concentration is preferably 200 ppm or less under a nitrogen atmosphere. Within this range, cross-linkage and curing are well performed around the surface.

A mercury lamp can be used as a light source of ultraviolet rays. The mercury lamp utilizes a lamp of from 20 to 240 W/cm$^2$ and is used at a speed of from 0.3 to 20 m/min. The distance between the membrane and the mercury lamp is preferably generally from 1 to 30 cm. When a desktop-type ultraviolet ray curing apparatus is used, curing is preferably performed after suitably controlling light amount and position of light source according to the material and environments for from about 1 second to about 10 minutes.

Use may be made of known radiation curing apparatuses, conditions, and the like, as described in "UV-EB curing techniques" (issued by Technical Integration Center, Corp.), "Application techniques of low-energy electric beam irradiation" (2000, issued by CMC Co. Ltd.), and the like. Curing may be carried out in conjunction with heating.

[Polymerization Initiator]

In the process of forming the gas separation membrane of the present invention, a radical polymerization initiator is preferably added, and a photopolymerization initiator is particularly preferably added.

The photopolymerization initiator that can be used in the present invention is a compound that causes chemical reaction, via action of light or interaction with a sensitizing dye in an electron-excited state, to produce at least one of radicals, acids, and bases.

The photopolymerization initiator may be appropriately selected for use from those having a sensitivity with respect to active radiation to be irradiated, such as ultraviolet rays of from 400 to 200 nm, far ultraviolet rays, g-rays, h-rays, i-rays, KrF excimer laser beam, ArF excimer laser beam, electron beams, X-rays, molecular beams, or ion beams.

Specifically, the photopolymerization initiator may be used from those known to those skilled in the art without limitation, and specific examples thereof include: the compounds as described in Bruce M. Monroe et al., Chemical Review, 93, 435 (1993); R. S, Davidson, Journal of Photochemistry and Biology A: Chemistry, 73, 81 (1993); J. P. Faussier, "Photonitiated Polymerization—Theory and Applications": Rapra Review Vol. 9, Report, Rapra Technology (1998); and M. Tsunooka et al., Prog. Polym. Sci., 21, 1 (1996). It is also possible to use the compounds for chemically amplified photoresists or photocation polymerization, as described in "Organic Materials for Imaging", edited by the Japanese Research Association for Organic Electronics Materials, published by Bunshin Design Printing Publishing and Digital Communications (1993), pp. 187-192. Further, compounds that cause bond cleavage in oxidative or reductive manner, via interaction with a sensitizing dye in an electron-excited state, are also known, such as those described in F. D. Saeva, Topics in Current Chemistry, 156, 59 (1990); G. G. Maslak, Topics in Current Chemistry, 168, 1 (1993); H. B. Shuster et al., JACS, 112, 6329 (1990); and I. D. F. Eaton et al., JACS, 102, 3298 (1980).

Preferred examples of the photopolymerization initiator include (a) aromatic ketones, (b) aromatic onium salt compounds, (c) organic peroxides, (d) hexaaryl biimidazole compounds, (e) ketoxime ester compounds, (f) borate compounds, (g) azinium compounds, (h) metallocene compounds, (i) active ester compounds, and (j) compounds having a carbon-halogen bond.

Preferred examples of the (a) aromatic ketones include: the compounds having a benzophenone skeleton or a thioxanthone skeleton, as described in J. P. Fouassier and J. F. Rabek, "Radiation Curing in Polymer Science and Technology" (1993), pp. 77-117. More preferred examples of the (a) aromatic ketones include: α-thiobenzophenone compounds, as described in JP-B-47-6416 ("JP-B" means examined Japanese patent publication); benzoin ether compounds, as described in JP-B-47-3981; α-substituted benzoin compounds, as described in JP-B-47-22326; benzoin derivatives, as described in JP-B-47-23664; aroyl phosphonates, as described in JP-A-57-30704; dialkoxybenzophenones, as described in JP-B-60-26483; benzoin ethers, as described in JP-B-60-26403, and JP-A-62-81345; α-aminobenzophenones, as described in JP-B-1-34242, U.S. Pat. No. 4,318, 791, and EP 0284561 A1; p-di(dimethylaminobenzoyl)benzenes, as described in JP-A-2-211452; thio-substituted aromatic ketones, as described in JP-A-61-194062; acylphosphinesulfides, as described in JP-B-2-9597; acylphosphines, as described in JP-B-2-9596; thioxanthones, as described in JP-B-63-61950; and coumarins, as described in JP-B-59-42864.

The (b) aromatic omium salts include aromatic omium salts of elements of Groups V, VI, and VII of the periodic table, and more specifically N, P, As, Sb, Bi, O, S, Se, Te, or I. Preferred examples of the (b) aromatic omium salts include: iodonium salts, as described in European Patent No. 104143, U.S. Pat. No. 4,837,124, JP-A-2-150848, and JP-A-2-96514; sulfonium salts, as described in European Patent No. 370693, European Patent No. 233567, European Patent No. 297443, European Patent No. 297442, European Patent No. 279210, European Patent No. 422570, U.S. Pat. No. 3,902,144, U.S. Pat. No. 4,933,377, U.S. Pat. No. 4,760,013, U.S. Pat. No. 4,734,444, and U.S. Pat. No. 2,833,827; diazonium salts (such as benzene diazonium which may have a substituent); resins of diazonium salts (such as formaldehyde resins of diazodiphenylamine); N-alkoxy pyrridium salts (such as those described in U.S. Pat. No. 4,743,528, JP-A-63-138345, JP-A-63-142345, JP-A-63-142346, and JP-B-46-42363, and more specifically 1-methoxy-4-phenylpyrridium tetrafluoroborate); and compounds, as described in JP-B-52-147277, JP-B-52-14278, and JP-B-52-14279. These salts produce radicals or acids as the active species.

The (c) "organic peroxides" include almost all organic compounds having one or more oxygen-oxygen bonds in the molecule, and preferred examples thereof include: peroxide esters, such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4, 4'-tetra-(cumylperoxycarbonyl)benzophenone, 3,3',4,4'-tetra-(p-iso-propylcumylperoxycarbonyl)benzophenone, and di-t-butyl di-peroxy isophthalate.

Examples of the (d) hexaaryl biimidazoles include: lophine dimers, as described in JP-B-45-37377, and JP-B-44-86516, such as 2,2'-bis(o-chlorophenyl)-4,4',5,5'-tetraphenyl-biimidazole, 2,2'-bis(o-bromophenyl)-4,4',5,5'-tetraphenyl-biimidazole, 2,2'-bis(o,p-dichlorophenyl)-4,4',5,5'-tetraphenyl-biimidazole, 2,2'-bis(o-chlorophenyl)-4,4',5,5'-tetra-(m-methoxyphenyl)-biimidazole, 2,2'-bis(o,o'-dichlorophenyl)-4,4',5,5'-tetraphenyl-biimidazole, 2,2'-bis (o-nitrophenyl)-4,4',5,5'-tetraphenyl-biimidazole, 2,2'-bis(o-methylphenyl)-4,4',5,5'-tetraphenyl-biimidazole, and 2,2'-bis(o-trifluorophenyl)-4,4',5,5'-tetraphenyl-biimidazole.

Examples of the (e) ketoxium esters include: 3-benzoyloxy-iminobutan-2-one, 3-acetoxy-iminobutan-2-one, 3-propionyloxy-iminobutan-2-one, 2-acetoxy-iminopentan-3-one, 2-acetoxyimino-1-phenylpropan-1-one, 2-benzoyloxyimino-1-phenylpropan-1-one, 3-p-toluene sulfonyloxyiminobutan-2-one, and 2-ethoxycarbonyloxyimino-1-phenylpropan-1-one.

Examples of the (1) borate salts, which are other examples of the photopolymerization initiator that can be used in the present invention, include: the compounds, as described in U.S. Pat. No. 3,567,453, U.S. Pat. No. 4,343,891, European Patent No. 109772, and European Patent No. 109773.

Examples of the (g) azinium salt compounds, which are other examples of the photopolymerization initiator, include: the compounds having N—O bond, as described in JP-A-63-138345, JP-A-63-142345, JP-A-63-142346, JP-A-63-143537, and JP-B-46-42363.

Examples of the (h) metallocene compounds, which are other examples of the photopolymerization initiator, include: titanocene compounds, as described in JP-A-59-152396, JP-A-61-151197, JP-A-63-41484, JP-A-2-249, and JP-A-2-4705; and iron-arene complexes, as described in JP-A-1-304453, and JP-A-1-152109.

Specific examples of the titanocene compound include: di-cyclopentadienyl-Ti-di-chloride, di-cyclopentadienyl-Ti-bis-phenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-bis-2,6-di-fluorophen-1-yl, di-cyclopentadienyl-Ti-bis-2,4-di-fluorophen-1-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)-bis(2,6-difluoro-3-(pyr-1-yl)phenyl) titanium, bis(cyclopentadienyl)bis[2,6-difluoro-3-(methylsulfonamide)phenyl]titanium, and bis (cyclopentadienyl)bis[2,6-difluoro-3-(N-butyl-biaroyl-amino)phenyl]titanium.

Examples of the (i) active ester compounds include: nitrobenzyl ester compounds, as described in European Patent No. 0290750, European Patent No. 046083, European Patent No. 156153, European Patent No. 271851, European Patent No. 0388343, U.S. Pat. No. 3,901,710, U.S. Pat. No. 4,181,531, JP-A-60-198538, and JP-A-53-133022; iminosulfonate compounds, as described in European Patent No. 0199672, European Patent No. 84515, European Patent No. 199672, European Patent No. 044115, European Patent No. 0101122, U.S. Pat. No. 4,618,564, U.S. Pat. No. 4,371, 605, U.S. Pat. No. 4,431,774, JP-A-64-18143, JP-A-2-245756, and JP-A-4-365048; and the compounds, as described in JP-B-62-6223, JP-B-63-14340, and JP-A-59-174831.

Preferred examples of the (j) compounds having a carbon-halogen bond include: the compounds, as described by Wakabayashi, et al., in Bull. Chem. Soc. Japan, 42, 2924 (1969); the compounds as described in GB Patent No. 1388492; the compounds, as described in JP-A-53-133428; and the compounds, as described in German Patent No. 3337024.

Other examples include: the compounds as described by F. C. Schaefer, et. al., in J. Org. Chem., 29, 1527 (1964); the compounds, as described in JP-A-62-58241; and the compounds, as described in JP-A-5-281728. Other examples include: the compounds, as described in German Patent No. 2641100; the compounds, as described in German Patent No. 3333450; the compounds, as described in German Patent No. 3021590; and the compounds, as described in German Patent 3021599.

The amount to be used of the polymerization initiator is preferably from 0.01 to 10 mass parts, more preferably from 0.1 to 5 mass parts, to mass part of the polymerizable compound.

[Co-Sensitizer]

Further, any known compound having a function of further improving sensitivity or suppressing polymerization inhibition due to oxygen, may be added, as a co-sensitizer, in the process of producing the gas separation membrane of the present invention.

Examples of such a cosensitizer include: amines, such as the compounds, as described by M. R. Sander et al., "Journal of Polymer Society", Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure Vol. 33825. Specific examples include: triethanolamine, ethyl p-dimethylaminobenzoate, p-formyldimethylaniline, and p-methylthiodimethylaniline.

Examples of other the co-sensitizer include: thiols and sulfides, such as thiol compounds, as described in JP-A-53-702, JP-B-55-500806, and JP-A-5-142772, and disulfide compounds, as described in JP-A-56-75643. Specific examples include: 2-mercaptobenzothiazole, 2-mercaptobenzoxazole, 2-mercaptobenzimidazole, 2-mercapto-4(3H)-quinazoline, and β-mercaptonaphthalene.

Other examples of the co-sensitizer include: amino acid compounds (such as N-phenylglycine); organometal compounds (such as tributyltin acetate), as described in JP-B-48-42965; hydrogen donors, as described in JP-B-55-34414; sulfur compounds (such as trithian), as described in JP-A-6-308727; phosphorous compounds (such as diethyl phosphite), as described in JP-A-6-250387; and Si—H or Ge—H compounds, as described in Japanese patent application No. 6-191605.

[Other Components, and the Like]

The gas separation membrane of the present invention may contain a variety of polymer compounds, to adjust membrane physical properties. Examples of the polymer compound that can be used include: acryl-based polymers, polyurethane resins, polyamide resins, polyester resins, epoxy resins, phenol resins, polycarbonate resins, polyvinyl butyral resins, polyvinyl formal resins, shelac, vinyl-based resins, acryl-based resins, rubber-based resins, waxes, and other natural resins. These resins may be used alone or in combination of two or more kinds thereof.

Moreover, a nonionic surfactant, a cationic surfactant, an organic fluoro surfactant, or the like, may be added, to adjust liquid physical properties.

Specific examples of the surfactant include: anionic surfactants, such as alkylbenzene sulfonates, alkyl naphthalene sulfonates, higher fatty acid salts, sulfonates of higher fatty acid esters, ester sulfates of higher alcohol ethers, sulfonates of higher alcohol ethers, alkyl carboxylates of higher alkylsulfoneamides, and alkylphosphates; and nonionic surfactants, such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxyethylene sorbitan fatty acid esters. Other examples include: amphoteric surfactants, such as alkyl betaines, and amide betaines; silicone-based surfactants; fluorine-based surfactants, and the like. The surfactant may be suitably selected from any conventionally known surfactants and derivatives thereof.

Specific examples of polymer dispersants include: polyvinyl pyrrolidone, polyvinyl alcohols, polyvinyl methylether, polyethylene oxide, polyethylene glycol, polypropylene glycol, and polyacryl amide. Among them, polyvinyl pyrrolidone is preferably used.

The conditions to form the gas separation membrane of the present invention are not particularly limited, but the temperature is preferably from −30 to 100° C., more preferably from −10 to 80° C., and particularly preferably from 5 to 50° C.

In the present invention, a gas, such as the air or oxygen, may coexist in formation of the membrane, but the formation is preferably performed under an inert gas atmosphere.

Moreover, an organic solvent may be added as a medium, in forming the gas separation membrane of the present invention. Specifically, organic solvents to be used are not particularly limited, but examples include: hydrocarbon-based organic solvents, such as n-hexane, and n-heptane; ester-based organic solvents, such as methyl acetate, ethyl acetate, and butyl acetate; lower alcohols, such as methanol, ethanol, n-propanol, isopropanol, n-butanol, isobutanol, and tert-butanol; aliphatic ketones, such as acetone, methyl ethyl ketone, methyl isobutyl ketone, and diacetone alcohol; ether-based organic solvents, such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl ether, and tetrahydrofuran; N-methylpyrrolidone, 2-pyrrolidone, dimethylformamide, dimethyl imidazolidinone, dimethyl sulfoxide, dimethyl acetamide, and the like. These solvents may be used alone or in combination of two or more thereof

[Method of Separating Gas Mixture]

The method of separating a gas mixture according to the present invention is a method of separating at least one acid gas from a mixed gas containing the at least one acid gas, with the gas separation membrane. The acid gas that can be separated by using the gas separation membrane or the composite membrane of the present invention is preferably carbon dioxide or hydrogen sulfide.

In the method of separating gas using the gas separation membrane of the present invention, the components of gas mixture of raw materials are not particularly restricted, but main components of the gas mixture are preferably carbon dioxide and methane or carbon dioxide and hydrogen. When the gas mixture is present together with an acid gas, such as carbon dioxide or hydrogen sulfide, the method of separating gas using the gas separation membrane of the present invention exhibits particularly excellent performance, preferably exhibits excellent performance in separation of carbon dioxide and hydrocarbon, such as methane, or carbon dioxide and nitrogen.

[Gas Separation Membrane Module and Gas Separation Apparatus]

The gas separation membrane of the present invention is preferably a composite membrane in combination with a porous support, and a gas separation membrane module using the same is preferred. Moreover, an apparatus for gas separation having means for separating and recovering or separating and purifying gas can be obtained, by using the gas separation membrane, the composite membrane, or the gas separation membrane module of the present invention.

The gas separation membrane of the present invention is preferably used in the form of a module. Examples of the module include: spiral, hollow, pleat, tubular, and plate and frame type. Moreover, the polymer membrane of the present invention may be applied to an apparatus for separating and recovering gas using a membrane/absorption hybrid method in combination with an absorption liquid, for example, as described in JP-A-2007-297605.

EXAMPLES

Hereinafter, the present invention will be described in more detail with reference to examples, but the present invention is not limited to these examples. In the following, "part" and "%" is in terms of mass, unless otherwise specified.

Synthetic Examples

<Synthesis of Monomers (M-2) and (M-5)>

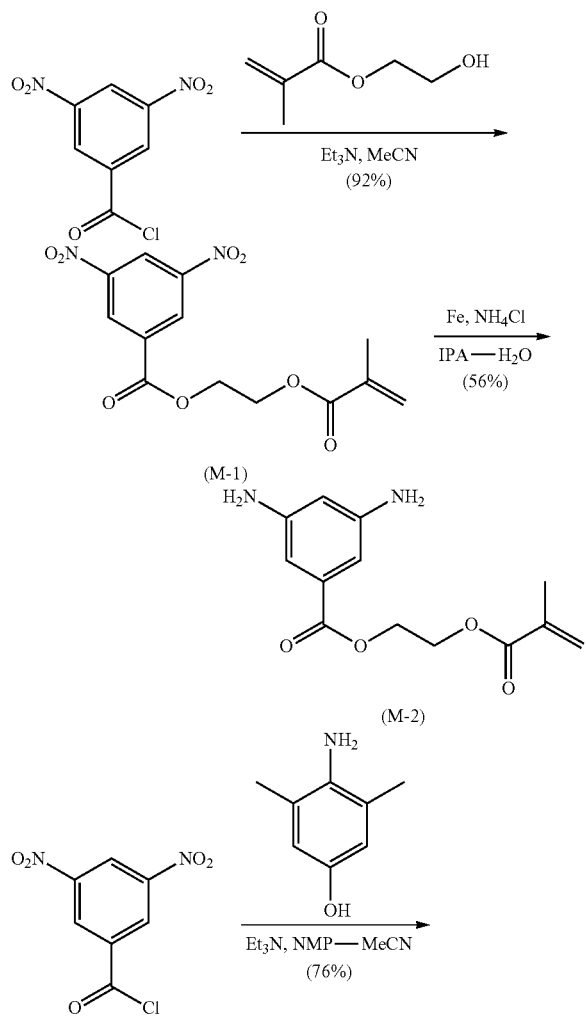

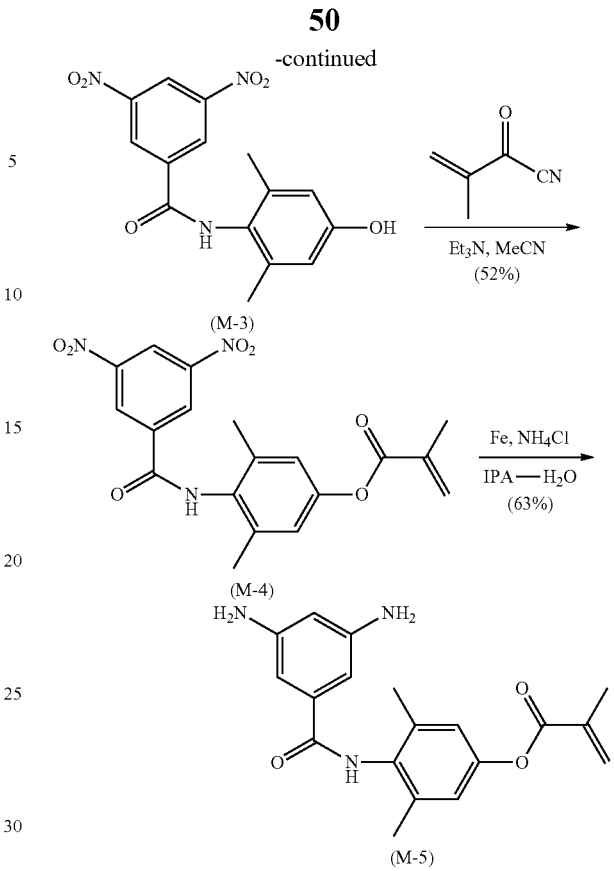

Herein, "Me" represents a methyl group, "Et" represents an ethyl group, "IPA" represents isopropyl alcohol, and "NMP" represents N-methylpyrrolidone.

Synthesis of Compound (M-1)

Into a 3-L three-necked flask, 130.14 g (1.0 mol) of 2-hydroxyethyl methacrylate (product number: 086-04385, manufactured by Wako Pure Chemical Industries, Ltd.) and 260 mL of acetonitrile were put, the resultant mixture was stirred under a nitrogen flow under ice-cooling, and thereto, an acetonitrile solution (460 mL) of 230.56 g (1.0 mol) of 3,5-dinitrobenzoyl chloride (product number: D0825, manufactured by Tokyo Chemical Industry Co. Ltd.) was added. Further, 146.5 mL (1.05 mmol) of triethylamine (product number: 292-02656, manufactured by Wako Pure Chemical Industries, Ltd.) was added dropwise thereto over 30 minutes or more. After completion of the dropwise addition, the resultant mixture was stirred for 1 hour under ice-cooling, and then gradually heated to room temperature. Water was added to the resultant reaction mixture, the thus-produced crystals were filtered, and then the thus-collected crude crystals were washed with ion exchanged water and methanol, to obtain 297.5 g of Compound (M-1) (Yield: 92%). The Compound (M-1) was used in the next reaction, without further purification.

$^1$H-NMR (300 MHz) δ=9.25 (br, t, J=2.1 Hz, 1H), 9.17 (br, d, J=2.1 Hz, 2H), 6.15-6.17 (m, 1H), 5.65-5.62 (m, 1H), 4.50-4.62 (m, 2H), 4.70-4.80 (m, 2H), 1.96 (s, 3H)

Synthesis of Compound (M-2)

Into a 3-L three-necked flask, 307.5 g (5.51 mol) of reduced iron (product number: 096-00785, manufactured by Wako Pure Chemical Industries, Ltd.), 49.1 g (0.92 mol) of ammonium chloride (product number: 018-20985, manufactured by Wako Pure Chemical Industries, Ltd.), 1,230 mL of 2-propanol, and 250 mL of water were put, and the resultant mixture was stirred under heating reflux. When heating reflux was confirmed, 49 mL of glacial acetic acid was added thereto, and the resultant mixture was stirred for 5 minutes under heating reflux, and then 297.53 g (0.918 mol) of the Compound (M-1) was carefully added thereto, and the resultant mixture was further stirred for 2 hours under heating reflux. The resultant reaction mixture was cooled to the vicinity of room temperature, and then 2 L of methanol was added thereto, an iron residue was removed off by performing Celite filtration, and the resultant filtrate was concentrated by a rotary evaporator. Ethyl acetate was added to the thus-obtained concentrate, and the resultant mixture was purified by silica gel column chromatography, followed by subjecting to recrystallization from a hexane-ethyl acetate mixed solution, to obtain 134.6 g of Compound (M-2) (Yield: 56%).

$^1$H-NMR (300 MHz) δ=6.78 (br, d, J=2.1 Hz, 2H), 6.19 (br, t, J=2.1 Hz, 1H), 6.12-6.16 (m, 1H), 4.48-4.54 (m, 2H), 4.43-4.48 (m, 2H), 1.95 (s, 3H)

Synthesis of Compound (M-3)

Into a 500-mL three-necked flask, 13.72 g (0.10 mol) of 4-amino-3,5-xylenol (product number: A1860, manufactured by Tokyo Chemical Industry Co. Ltd.), 41 mL of N-methyl pyrrolidone, and 41 mL of acetonitrile were put, the resultant mixture was stirred under a nitrogen flow under ice-cooling, and thereto, 14.7 mL (1.0 mol) of triethylamine (product number: 292-02656, manufactured by Wako Pure Chemical Industries, Ltd.) was added. Further, 30 mL of an acetonitrile solution of 23.06 g (0.10 mol) of 3,5-dinitrobenzoyl chloride (product number: D0825, manufactured by Tokyo Chemical Industry Co. Ltd.) was added dropwise thereto over 30 minutes or more. After completion of the dropwise addition, the resultant mixture was stirred for 1 hour under ice-cooling, and then gradually heated to room temperature. Water was added to the resultant reaction mixture, the thus-produced crystals were filtered, and then the thus-collected crude crystals were washed with ion exchanged water and acetonitrile-H$_2$O (1:1), to obtain 14.6 g of Compound (M-3) (Yield: 44%). The Compound (M-3) was used in the next reaction, without further purification.

Synthesis of Compound (M-4)

Into a 500-mL three-necked flask, 9.5 g (0.029 mol) of the Compound (M-3) and 180 mL of acetonitrile were put, the resultant mixture was stirred under a nitrogen flow under ice-cooling, and thereto, 4.4 mL (0.032 mol) of triethylamine (product number: 292-02656, manufactured by Wako Pure Chemical Industries, Ltd.) was added. Further, an acetonitrile solution (30 mL) of 3.0 g (0.029 mol) of methacryloyl chloride (product number: 130-11742, manufactured by Tokyo Chemical Industry Co. Ltd.) was added dropwise thereto over 30 minutes or more. After completion of the dropwise addition, the resultant mixture was stirred for 1 hour under ice-cooling, and then gradually heated to room temperature. Water was added to the resultant reaction mixture, the thus-produced crystals were filtered, and then the thus-collected crude crystals were washed with ion exchanged water and acetonitrile-H$_2$O (1:1), to obtain 7.2 g of Compound (M-4) (Yield: 52%). The Compound (M-4) was used in the next reaction, without further purification.

Synthesis of Monomer (M-5)

Into a 500-mL three-necked flask, 13.0 g (mol) of reduced iron (product number: 096-00785, manufactured by Wako Pure Chemical Industries, Ltd.), 1.3 g (mol) of ammonium chloride (product number: 018-20985, manufactured by Wako Pure Chemical Industries, Ltd.), 130 mL of 2-propanol, and 250 mL of water were put, and the resultant mixture was stirred under heating reflux. When heating reflux was confirmed, 1.3 mL of glacial acetic acid was added thereto, and the resultant mixture was stirred for 5 minutes under heating reflux, and then 13.0 g (mol) of the Compound (M-4) was carefully added thereto, and the resultant mixture was further stirred for 2 hours under heating reflux. The resultant reaction mixture was cooled to the vicinity of room temperature, and then 0.5 L of ethyl acetate was added thereto, an iron residue was removed off by performing Celite filtration, and the resultant filtrate was concentrated by a rotary evaporator. Ethyl acetate was added to the thus-obtained concentrate, and the resultant mixture was purified by silica gel column chromatography, followed by subjecting to recrystallization from a hexane-ethyl acetate mixed solution, to obtain 7.01 g of the compound (M-5) (Yield: 63%).

$^1$H-NMR (300 MHz) δ=9.35 (br, s, 1H), 6.91 (br, 2H), 6.35 (br, d, J=2.1 Hz, 2H), 6.26 (br, s, 1H), 5.99 (br, 1H), 5.89 (br, 1H), 4.92 (br, s, 4H), 2.16 (s, 6H), 2.00 (s, 3H)

Synthetic Example

<Synthesis of Polymer (P-1)>

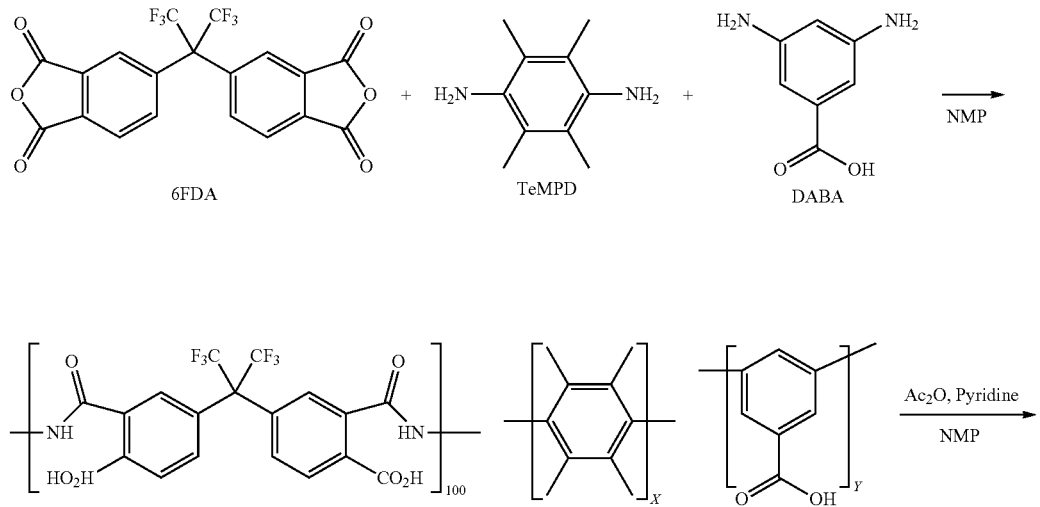

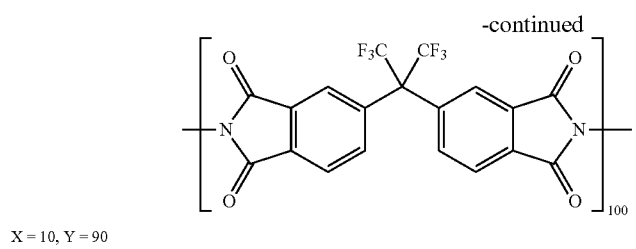
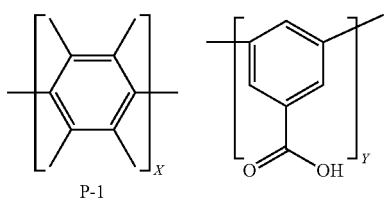

X = 10, Y = 90

Synthesis of Polymer (P-1)

Into a 1-L three-necked flask, 123 mL of N-methylpyrrolidone and 54.97 g (0.124 mol) of 6FDA (product number: manufactured by Tokyo Chemical Industry Co. Ltd.) were put, to allow dissolution at 40° C., the resultant mixture was stirred under a nitrogen flow, and thereto, 84.0 mL of N-methylpyrrolidone solution containing 2.037 g (0.0124 mol) of 2,3,5,6-tetramethylphenylenediamine (product number: T1457, manufactured by Tokyo Chemical Industry Co. Ltd.), and 16.98 g (0.1116 mol) of DABA was added dropwise thereto over 30 minutes while keeping the inside of the system at 40° C. The resultant reaction mixture was stirred at 40° C. for 2.5 hours, and then 2.94 g (0.037 mol) of pyridine (product number: , manufactured by Wako Pure Chemical Industries, Ltd.) and 31.58 g (0.31 mol) of acetic anhydride (product number: , manufactured by Wako Pure Chemical Industries, Ltd.) were added thereto, respectively, and the resultant mixture was stirred at 80° C. for 3 hours. Then, 676.6 mL of acetone was added to the reaction mixture, and the reaction mixture was diluted. Into a 5-L stainless steel container, 1.15 L of methanol and 230 mL of acetone were put, the resultant mixture was stirred, and thereto, the acetone diluted liquid of the reaction mixture was added dropwise. The thus-obtained polymer crystals were subjected to suction filtration, and air blow drying at 60° C., to obtain 51.3 g of Polymer (P-1).

<Synthesis of Polymer (P-2)>

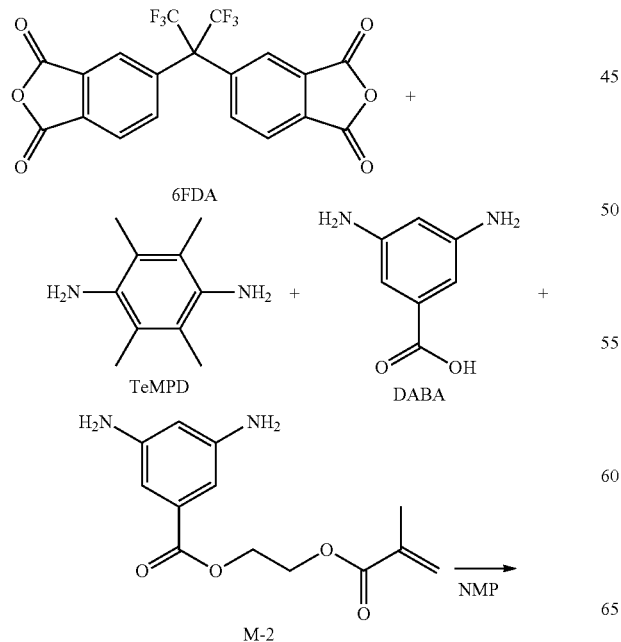

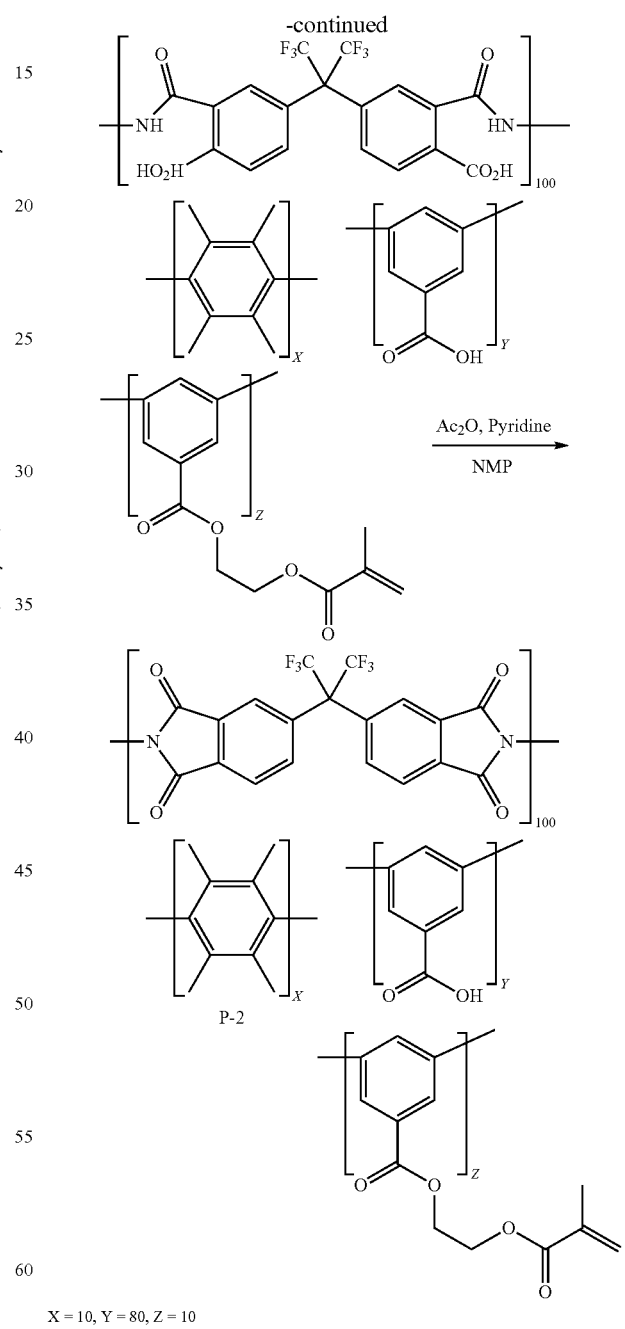

X = 10, Y = 80, Z = 10

Synthesis of Polymer (P-2)

Into a 1-L three-necked flask, 123 mL of N-methylpyrrolidone and 54.97 g (0.124 mol) of 6FDA (product number:

H0771, manufactured by Tokyo Chemical Industry Co. Ltd.) were put, to allow dissolution at 40° C., the resultant mixture was stirred under a nitrogen flow, and thereto, 87.2 mL of N-methylpyrrolidone solution containing 2.037 g (0.0124 mol) of 2,3,5,6-tetramethylphenylenediamine (product number: T1457, manufactured by Tokyo Chemical Industry Co. Ltd.), 15.09 g (0.0992 mol) of DABA, 3.277 g (0.0124 mol) of the Monomer (M-2) and Irganox 1010 (0.132 g) was added dropwise over 30 minutes while keeping the inside of the system at 40° C. The resultant reaction mixture was stirred at 40° C. for 2.5 hours, and then 2.94 g (0.037 mol) of pyridine (product number: 166-22575, manufactured by Wako Pure Chemical Industries, Ltd.) and 31.58 g (0.31 mol) of acetic anhydride (product number: 018-00286, manufactured by Wako Pure Chemical Industries, Ltd.) were added thereto, respectively, and the resultant mixture was stirred at 80° C. for 3 hours. Then, 676.6 mL of acetone was added to the reaction mixture, and the reaction mixture was diluted. Into a 5-L stainless steel container, 1.15 L of methanol and 230 mL of acetone were put, the resultant mixture was stirred, and thereto, the acetone diluted liquid of the reaction mixture was added dropwise. The thus-precipitated polymer was subjected to suction filtration, and air blow drying at 60° C., to obtain 54.7 g of Polymer (P-2).

hours, and then 150 ml of toluene was added thereto, and further the temperature was elevated up to 180° C. and the resultant mixture was stirred at that temperature for 6 hours. A toluene-water mixed solution having become azeotropic in the course of the reaction was distilled off, using a Dean-Stark water separator. After completion of the reaction, the system was cooled to around room temperature, and then diluted by adding thereto 400 mL of acetone. Into a 5-L stainless steel container, 1.15 L of methanol and 230 mL of water were put, the resultant mixture was stirred, and thereto, the acetone diluted liquid of the reaction mixture was added dropwise. The thus-precipitated polymer was subjected to suction filtration, and air blow drying at 60° C., to obtain 36.9 g of the target polymer.

Example 1 and Comparative Example 1

[Sample 101]

In a 30-mL brown vial, 1.4 g of the Polymer (P-1), 0.20 g of a crosslinking agent (R-1: manufactured by Tokyo Chemical Industry Co. Ltd., product number: B-1796), and 91.9 g of methyl ethyl ketone were mixed, the resultant mixture was stirred for 30 minutes, 1.4 mg of tetraphenylphosphonium bromide (manufactured by Tokyo Chemical

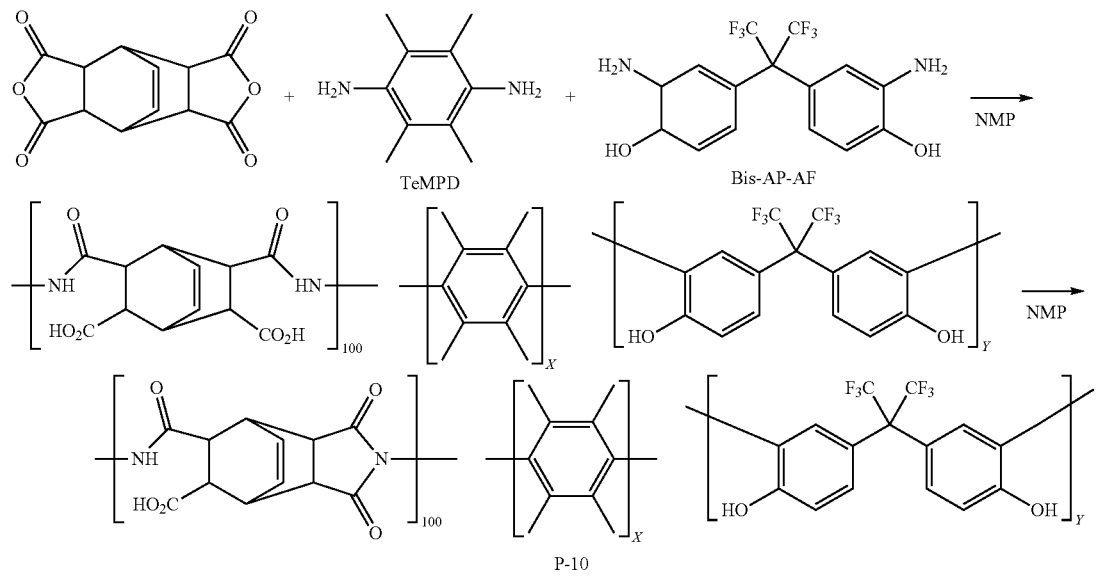

X = 55, Y = 45

Synthesis of Polymer (P-10)

Into a 1-L three-necked flask, 130 mL of N-methylpyrrolidone and 24.82 g (0.100 mol) of bicyclo[2.2.2]oct-7-ene-2,3,5,6-tetracarboxylic dianhydride (product number: B1317, manufactured by Tokyo Chemical Industry Co. Ltd.) were put to, the resultant mixture was stirred under a nitrogen flow under ice-cooling, and thereto, 81 mL of N-methylpyrrolidone solution containing 9.033 g (0.055 mol) of 2,3,5,6-tetramethylphenylenediamine (product number: T1457, manufactured by Tokyo Chemical Industry Co. Ltd.) and 16.48 g (0.045 mol) of 2,2-bis(3-amino-4-hydroxyphenyl)hexafluoropropane (product number: B 1415, manufactured by Tokyo Chemical Industry Co. Ltd.) was added dropwise over 30 minutes while keeping the inside of the system at 10° C. or lower. After completion of dropwise addition, the reaction liquid was stirred at 40° C. for 2.5

Industry Co. Ltd., product number: T1069, hereinafter referred to as "Ph$_4$PBr") was further added thereto, and the resultant mixture was stirred for 30 minutes. On a 10-cm square clean glass plate, a polyacrylonitrile porous membrane (manufactured by GMT Membrantechnik GmbH) was left to stand, the polymer liquid was cast on the surface of the porous support membrane using an applicator, and the resultant material was left to stand at a room temperature for 5 minutes. Further, the reaction was still continued at 70° C. for 15 minutes, to obtain a cured membrane 101. The thickness of the Polymer (P-1) layer was about 0.1 μm, and the thickness of the polyacrylonitrile porous membrane, including a nonwoven fabric, was about 180 μm.

[Sample 102]

In a 30-mL brown vial, 1.4 g of the Polymer (P-1), 0.20 g of a crosslinking agent (R-1: manufactured by Tokyo Chemical Industry Co. Ltd., product number: B-1796), and 91.9 g of methyl ethyl ketone were mixed, the resultant mixture was stirred for 30 minutes, 2 mg of tri-p-tolylsulfonium hexafluorophosphate (manufactured by Tokyo Chemical Industry Co. Ltd., product number: T2041, hereinafter referred to as "Tol$_3$SPF$_6$") was further added thereto, and the resultant mixture was stirred for 30 minutes. On a 10-cm square clean glass plate, a polyacrylonitrile porous membrane (manufactured by GMT Membrantechnik GmbH) was left to stand, the polymer liquid was cast on the surface of the porous support membrane using an applicator, and the resultant material was immediately exposed to light at 10 mW for 60 seconds, using a photo-curing apparatus (TCT1000B-28HE) manufactured by Sen Lights Corporation, to obtain a cured membrane 102. The thickness of the Polymer (P-1) layer was about 0.2 μm, and the thickness of the polyacrylonitrile porous membrane, including a nonwoven fabric, was about 180 μm.

[Sample 103]

In a 30-mL brown vial, 1.4 g of the Polymer (P-2) and 91.9 g of methyl ethyl ketone were mixed, the resultant mixture was stirred for 30 minutes, 28 mg of 1-hydroxycyclohexyl phenyl ketone (manufactured by Aldrich, product number: 40,561-2) was further added thereto, and the resultant mixture was stirred for 30 minutes. On a 10-cm square clean glass plate, a polyacrylonitrile porous membrane (manufactured by GMT Membrantechnik GmbH) was left to stand, the polymer liquid was cast on the surface of the porous support membrane using an applicator, and the resultant material was immediately exposed to light at 10 mW for 60 seconds, using photo-curing apparatus (TCT1000B-28HE) manufactured by Sen Lights Corporation, to obtain a composite membrane 103. The thickness of the Polymer (P-2) layer was about 0.1 μm, and the thickness of the polyacrylonitrile porous membrane, including a nonwoven fabric, was about 180 μm.

Composite membranes 104 and 105 were produced in the same manner as in the production of the membrane 103, except that the polyacrylonitrile porous membrane was changed to a polysulfone or polyphenylene oxide porous membrane, respectively. In the composite membrane 111, the Polymer (P-12) was used.

Composite membranes 106 to 110, and 112 were produced in the same manner as in the production of the membrane 102, except that P-1 and R-1 were changed to the polymer and the crosslinking agent, respectively, as shown in the following table.

Comparative Examples

Polymer Described in U.S. Pat. No. 7,247,191 B2

Into a 1-L three-necked flask, 100 mL of N-methylpyrrolidone and 12.0 g (0.027 mol) of 6FDA (product number: , manufactured by Tokyo Chemical Industry Co., Ltd.) were put to allow dissolution at 40° C., the resultant mixture was stirred under a nitrogen flow, and thereto, 65 mL of N-methylpyrrolidone solution containing 3.25 g (0.0216 mol) of mesitylenediamine (product number: , manufactured by Tokyo Chemical Industry Co., Ltd.) and 0.82 g (0.0054 mol) of 3,5-diaminobenzoic acid (product number: , manufactured by Tokyo Chemical Industry Co., Ltd.) was added dropwise over 30 minutes while keeping the inside of the system at 40° C. The resultant reaction mixture was stirred at 40° C. for 2.5 hours, and then 0.64 g (0.0081 mol) of pyridine (manufactured by Wako Pure Chemical Industries, Ltd., product number:) and 6.89 g (0.068 mol) of acetic anhydride (manufactured by Wako Pure Chemical Industries, Ltd., product number:) were added thereto, respectively, and the resultant mixture was stirred at 80° C. for 3 hours. Then, 150 mL of acetone was added to the reaction mixture, and the reaction mixture was diluted. Into a 5-L stainless steel container, 1.5 L of methanol was put and stirred, and thereto, the acetone diluted liquid of the reaction mixture was added dropwise. The thus-obtained polymer crystals were subjected to suction filtration, and air blow drying at 60° C., to obtain 8.3 g of Polymer (A). To this Polymer (A), ethylene glycol was added in an amount equivalent to 3,5-diaminobenzoic acid, the resultant polymer liquid was cast on the respective porous support membrane of polyacrylonitrile, polysulfone and polyphenylene oxide using an applicator in the same manner as in the operations in Example 1, in the similar manner as in the method described in U.S. Pat. No. 7,247,191 B2, to prepare crosslinked composite membranes c11, c12, and c13, respectively.

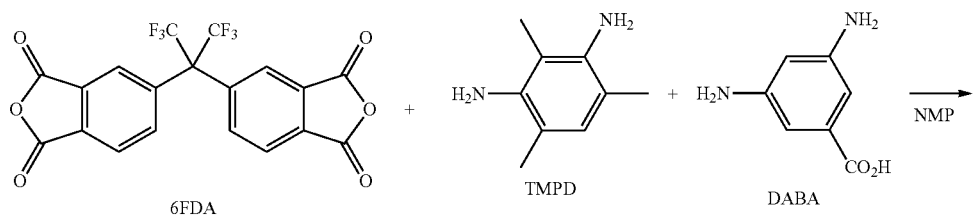

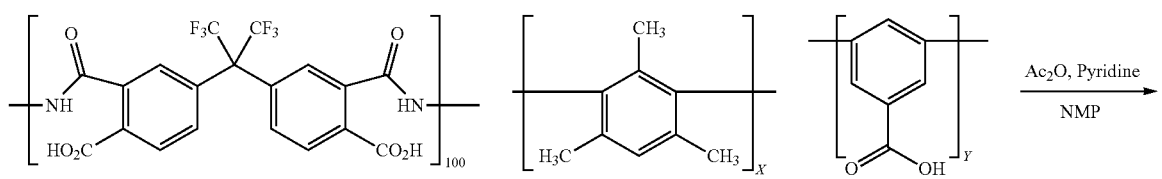

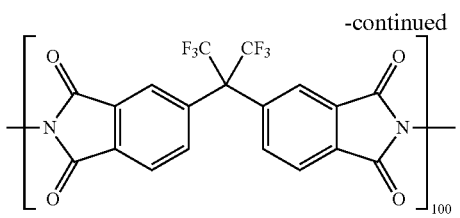
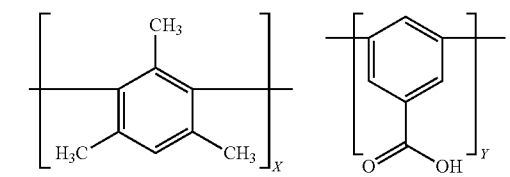

Polymer described in U.S. Pat. No. 7,247,191 B2

X = 60, Y = 40

With reference to European Polymer Journal, Vol. 33, No. 10-12, 1717-1721 (1997), a 6FDA/M-2 photo-cured-polyphenylene oxide (PPO) composite membrane c14 was prepared.

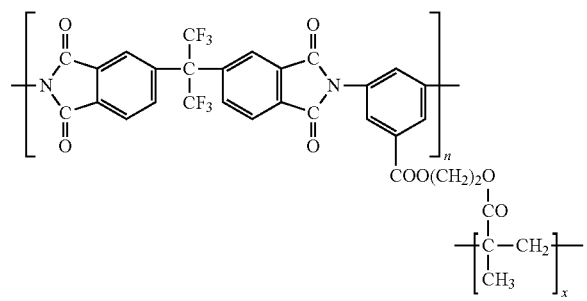

Polymer described in European Polymer Journal, 1997, 33, 1717

(Measurement of Gas Permeability)

Using a pressure-resistant stainless cell made of SUS (manufactured by DENISSEN), and using a mass flow controller in a manner such that a ratio of carbon dioxide ($CO_2$) to methane ($CH_4$) would become 1:1, and that a total pressure at the gas supply side at 40° C. would be set to 40 atmospheres (partial pressure of $CO_2$ or $CH_4$:20 atmospheres), each of $CO_2$ gas permeability and $CH_4$ gas permeability of the thus-obtained composite membranes were measured by a TDC-sensing gas chromatography, respectively. The gas permeability of the membrane was compared by calculating gas transmission rate (permeance). The unit of the gas transmission rate (permeance) is expressed in terms of a GPU unit (1 GPU=$1 \times 10^{-6}$ $cm^3$ (STP)/(s·$cm^2$·cmHg)).

(Bending Test [Membrane-Forming Competence Test])

The gas separation membrane according to the present invention is preferably utilized in a package, referred to as a module or an element, in which the membrane is packed. When the gas separation membrane is used for the module, the membranes are packed with high density in order to increase a membrane surface area, and thus packed by bending the membranes in a spiral shape in a flat sheet membrane. Therefore, sufficient bending strength should be provided with the membrane. In order to confirm the performance, operations of bending each of the thus-obtained composite membrane at 180 degrees and unbending the membrane were repeated by 50 times, and then whether or not measurement of the gas permeability was possible to conduct again was confirmed.

A: Measurement of permeability was possible, without any problem.

B: Measurement of permeability was not possible.

The results of the gas permeability and the bending test are shown in Table 1.

TABLE 1

| Sample No. | Polymer No. | PI molecular weight (×1,000)* | Supporting membrane | Crosslinking form | Crosslinking agent | Crosslinkable site ratio [κ] | Crosslinking conversion ratio [α] | Curing |
|---|---|---|---|---|---|---|---|---|
| 101 | P-1 | 98 | PAN | Cation | R-1 | 0.45 | 85 | Heat |
| 102 | P-1 | 98 | PAN | Cation | R-1 | 0.45 | 52 | UV |
| 103 | P-2 | 113 | PAN | Radical | — | 0.45 | 75 | UV |
| 104 | P-2 | 113 | PSf | Radical | — | 0.45 | 75 | UV |
| 105 | P-2 | 113 | PPO | Radical | — | 0.45 | 76 | UV |
| 106 | P-4 | 70 | PAN | Cation | — | 0.45 | 73 | UV |
| 107 | P-10 | 120 | PAN | Cation | R-2 | 0.45 | 68 | UV |
| 108 | P-10 | 120 | PAN | Cation | R-2, R-12 | 0.45 | 86 | UV |
| 109 | P-16 | 152 | PAN | Cation | R-2 | 0.475 | 78 | UV |
| 110 | P-19 | 66 | PAN | Cation | R-1 | 0.45 | 56 | UV |
| 111 | P-12 | 112 | PAN | Radical | — | 0.42 | 30 | UV |
| 112 | P-20 | 73 | PAN | Cation | R-1 | 0.49 | 20 | UV |
| c11 | — | 105 | PAN | Ester | — | 0.2 | 90 | Heat |
| c12 | — | 105 | PSf | Ester | — | 0.2 | 97 | Heat |
| c13 | — | 105 | PPO | Ester | — | 0.2 | 96 | Heat |
| c14 | — | 83 | PPO | Radical | — | 0.5 | 100 | Heat |

| Sample No. | Crosslinking temp/time period | $CO_2$ permeability (GPU) | $CO_2/CH_4$ separation selectivity | Bending test (Membrane forming competence) |
|---|---|---|---|---|
| 101 | R.T./15 min | 84 | 34 | A |
| 102 | R.T./1 min | 93 | 32 | A |

TABLE 1-continued

| | | | | |
|---|---|---|---|---|
| 103 | R.T./1 min | 104 | 34 | A |
| 104 | R.T./1 min | 67 | 32 | A |
| 105 | R.T./1 min | 70 | 32 | A |
| 106 | R.T./1 min | 83 | 33 | A |
| 107 | R.T./1 min | 58 | 33 | A |
| 108 | R.T./1 min | 58 | 33 | A |
| 109 | R.T./1 min | 63 | 37 | A |
| 110 | R.T./1 min | 58 | 35 | A |
| 111 | R.T./15 sec | 46 | 30 | A |
| 112 | R.T./10 sec | 42 | 28 | A |
| c11 | 150° C., 25 h | The membrane was broken | — | B |
| c12 | 150° C., 25 h | The membrane was broken | — | B |
| c13 | 150° C., 25 h | 10 | 9 | B |
| c14 | 80° C., 60 min<br>150° C., 60 min<br>165° C., 30 min<br>190° C., 10 min | 5 | 5 | B |

*Weight-average molecular weight of the polyimide compound before the crosslinking
PAN: Polyacrylonitrile
PSf: Polysulfone
PPO: Polyphenyleneoxide
Radical: Radical crosslinking
Cation: Cation crosslinking
Ester: Transesterification
Room temperature (R.T.): about 25° C.

It is understood that the gas separation membrane of the present invention is provided with high carbon dioxide permeability and high separation selectivity, and also with a high bending strength.

Example 2 and Comparative Example 2

(Sample Error Ratio)

50 samples of each of the gas separation membranes described in the above Examples and Comparative examples were prepared, and just then, hydrogen permeability of the respective sample was measured. The sample showing the gas permeability value higher than $1 \times 10^6$ ml/m$^2$·24 h·atm was judged as a membrane having pinholes, and a value obtained by dividing the number of membranes having pinholes by the number of prepared samples was calculated as a sample error ratio.

The thus-obtained results of the sample error ratio of the gas separation membranes described in those Examples and Comparative examples, are shown in Table 2.

TABLE 2

| Sample No. | Sample error ratio [%] |
|---|---|
| 101 | 6 |
| 102 | 12 |
| 103 | 18 |
| 104 | 14 |
| 105 | 4 |
| 106 | 6 |
| 107 | 6 |
| 108 | 8 |
| 109 | 6 |
| 110 | 10 |
| 111 | 8 |
| 112 | 8 |
| c11 | — |
| c12 | — |
| c13 | 46 |
| c14 | 66 |

As is apparent from the above, the present invention can provide the method of producing favorable gas separation membranes, with few pinholes.

Example 3 and Comparative Example 3

Next, in a glass container filled with a toluene solvent, which is possible for a cover, a 100-ml beaker was placed for still standing. Further, in the beaker, the gas separation composite membranes prepared in the above Examples and Comparative examples were put, and by covering it with a glass cover, a hermetically-closed system was made. Then, after storage for 24 hours under the conditions of 40° C., the gas permeability test was carried out in the same manner as described above. The results investigating a change of $CO_2/CH_4$ separation selectivity are shown below.

TABLE 3

| Sample No. | Separation selectivity | Separation selectivity (After toluene-exposure test) |
|---|---|---|
| 101 | 34 | 29 |
| 102 | 32 | 27 |
| 103 | 34 | 29 |
| 104 | 32 | 26 |
| 105 | 32 | 30 |
| 106 | 33 | 30 |
| 107 | 33 | 27 |
| 108 | 33 | 30 |
| 109 | 37 | 29 |
| 110 | 35 | 31 |
| 111 | 30 | 28 |
| 112 | 28 | 27 |

The above results show that the gas separation membrane according to the present invention is excellent in gas permeability and gas separation selectivity even under high pressure conditions, particularly permeability of carbon dioxide, and is excelled as the separation membrane of carbon dioxide/methane. Further, the composite membrane having a membrane strength can be prepared at a low temperature in a short time period, and therefore is excellent in production competence. Furthermore, the membrane is excellent in stability under the co-existence of toluene, exhibits stable performance over a long period of time. It is understood that the gas separation membrane and composite membrane of the present invention can provide a gas separation method, a gas separation membrane module, a gas separation/gas purification apparatus containing the gas separation membrane module, each of which exhibits excellent performance.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Gas separating layer
2 Porous layer
3 Nonwoven fabric layer
10 and 20 Gas separation composite membrane

The invention claimed is:
1. A gas separation composite membrane comprising:
a gas-permeable supporting layer; and
a gas separating layer containing a crosslinked polyimide resin, over the gas-permeable supporting layer,
wherein the crosslinked polyimide resin is composed of a polyimide compound having been crosslinked through an ester linking group, the polyimide compound containing a repeating unit represented by the following formula (I), a repeating unit represented by the following formula (II-a) or (II-b), and a repeating unit represented by the following formula (III-a) or (III-b):

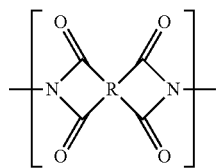
(I)

wherein, in formula (I), R is a group of atoms selected from the group consisting of groups represented by any one of the following formulas (I-a) to (I-g):

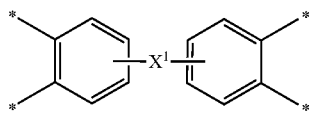
(I-a)

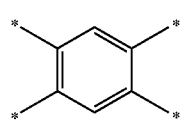
(I-b)

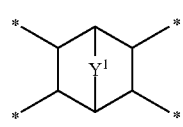
(I-c)

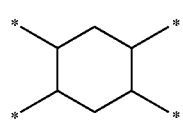
(I-d)

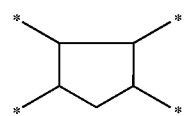
(I-e)

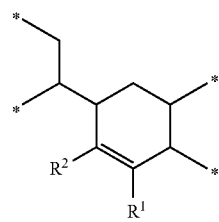
(I-f)

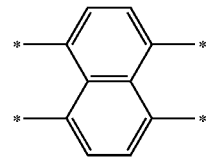
(I-g)

wherein, in formulas (I-a) to (I-g), $X^1$ represents a single bond or a divalent linking group; $Y^1$ represents a methylene group or a vinylene group; $R^1$ and $R^2$ each independently represent a hydrogen atom or a substituent; and the symbol "*" represents a binding site;

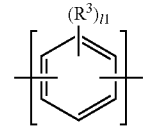
(II-a)

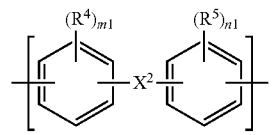
(II-b)

wherein, in formulas (II-a) and (II-b), $R^3$, $R^4$ and $R^5$ each independently represent a substituent; l1, m1 and n1 each independently are an integer of from 0 to 4; and $X^2$ represents a single bond or a divalent linking group; and

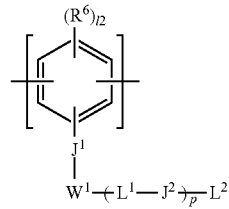
(III-a)

-continued

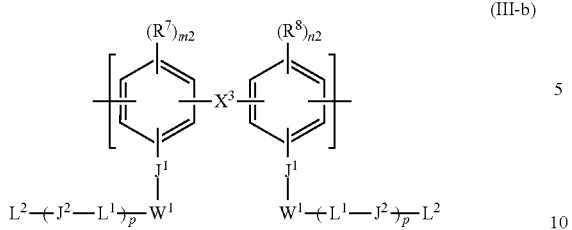
(III-b)

wherein, in formulas (III-a) and (III-b), $R^6$, $R^7$ and $R^8$ each independently represent a substituent; $J^1$, $J^2$ and $W^1$ each independently represent a single bond or a divalent linking group; l2, m2 and n2 each independently are an integer of from 0 to 3; $L^1$ represents a divalent linking group; $L^2$ represents a crosslinkable functional group which is capable of forming an ester covalent bond or a crosslinkable functional group which crosslinks other than by the ester covalent bond and when the ester linking group is other than a reaction-produced site of $L^2$, $J^1$ or $J^2$ is the ester linking group; p represents an integer of 0 or more; $X^3$ represents a single bond or a divalent linking group; and -$J^1$-$W^1$-$(L^1$-$J^2)_p$-$L^2$ is a site for forming a crosslinked chain mediated by the ester linking group upon being crosslinked, and wherein a ratio [κ] of the site for forming the crosslinked chain mediated by the ester linking group to imide groups in the polyimide compound (number of the site forming the crosslinked chain mediated by the ester linking group/number of the imide groups in the polyimide compound) is more than 0.4 and less than 0.5.

2. The gas separation composite membrane according to claim 1, wherein a gas to be supplied is a mixed gas of carbon dioxide and methane, wherein a transmission rate of the carbon dioxide at 40° C. and 40 atmospheric pressure is more than 20 GPU, and wherein a ratio of the transmission rate of the carbon dioxide to a transmission rate of the methane ($R_{CO2}$/$R_{CH4}$) is 15 or more.

3. The gas separation composite membrane according to claim 1, wherein the supporting layer contains a porous layer on a side of the gas separating layer and a nonwoven fabric layer on a side reverse thereto.

4. The gas separation composite membrane according to claim 3, wherein the porous layer has a molecular weight cut-off of 100,000 or less.

5. A method of producing the gas separation composite membrane according to claim 1 comprising:
providing the polyimide compound containing the repeating unit represented by the following formula (I), the repeating unit represented by the following formula (II-a) or (II-b), and the repeating unit represented by the following formula (III-a) or (III-b):

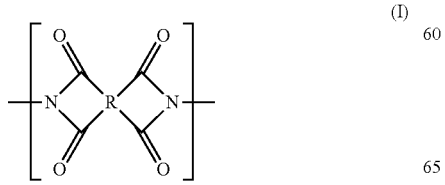
(I)

wherein, in formula (I), R is the group of atoms selected from the group consisting of groups represented by any one of the following formulas (I-a) to (I-g):

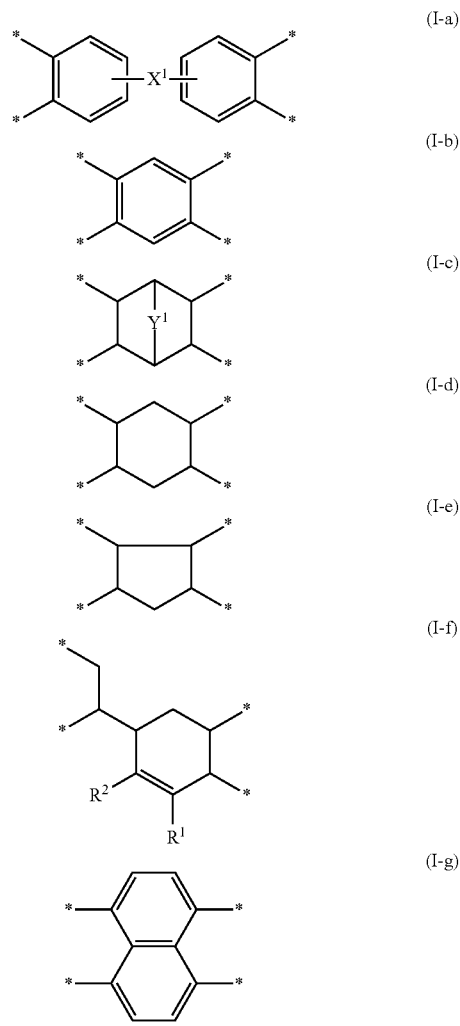

wherein, in formulas (I-a) to (I-g), $X^1$ represents the single bond or the divalent linking group; $Y^1$ represents the methylene group or the vinylene group; $R^1$ and $R^2$ each independently represent the hydrogen atom or the substituent; and the symbol "*" represents the binding site;

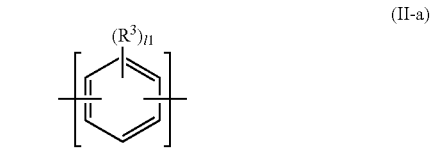
(II-a)

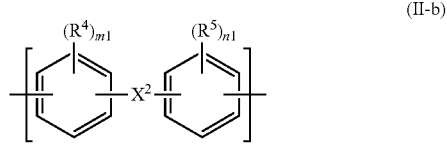
(II-b)

wherein, in formulas (II-a) and (II-b), $R^3$, $R^4$ and $R^5$ each independently represent the substituent; l1, m1 and n1 each independently are the integer of from 0 to 4; and $X^2$ represents the single bond or the divalent linking group; and

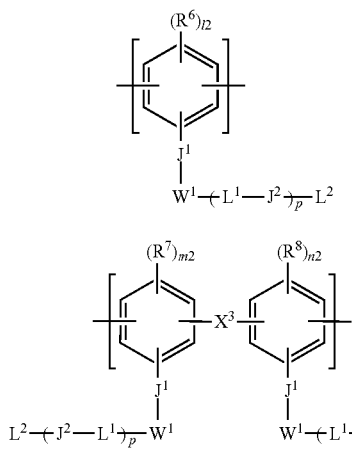
(III-a)

(III-b)

wherein, in formulas (III-a) and (III-b), $R^6$, $R^7$ and $R^8$ each independently represent the substituent; $J^1$, $J^2$ and $W^1$ each independently represent the single bond or the divalent linking group; l2, m2 and n2 each independently are the integer of from 0 to 3; $L^1$ represents the divalent linking group; $L^2$ represents a radical crosslinkable ester functional group; p represents the integer of 0 or more; $X^3$ represents the single bond or the divalent linking group; and $-J^1-W^1-(L^1-J^2)_p-L^2$ is the site for forming the crosslinked chain mediated by the ester linking group upon being crosslinked, and wherein the ratio [κ] of the site for forming the crosslinked chain mediated by the ester linking group to imide groups in the polyimide compound (number of the site for forming a the crosslinked chain mediated by the ester linking group/number of the imide groups in the polyimide compound) is more than 0.4 and less than 0.5;

applying a coating liquid containing the polyimide compound, over the gas-permeable supporting layer to form the gas separating layer; and subjecting the radical crosslinkable ester functional group to a crosslinking reaction by irradiating an active radiation or applying heat to the coating liquid, to crosslink the polyimide compound.

6. The method of producing the gas separation composite membrane according to claim 5, wherein a crosslinking conversion ratio [α] [a crosslinked site/a crosslinkable site] is set to be 5% or more and 100% or less, in the crosslinking reaction of the polyimide compound.

7. The method of producing the gas separation composite membrane according to claim 5, wherein the crosslinking of the polyimide compound is carried out under the conditions of 10 to 120° C.

8. A method of producing the gas separation composite membrane according to claim 1, comprising:
providing the polyimide compound containing the repeating unit represented by the following formula (I), the repeating unit represented by the following formula (II-a) or (II-b), and the repeating unit represented by the following formula (III-a) or (III-b):

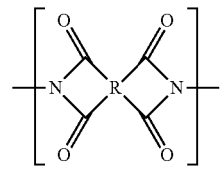
(I)

wherein, in formula (I), R is the group of atoms selected from the group consisting of groups represented by any one of the following formulas (I-a) to (I-g):

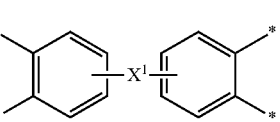
(I-a)

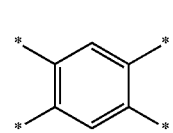
(I-b)

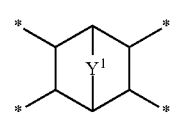
(I-c)

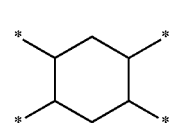
(I-d)

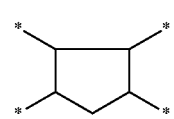
(I-e)

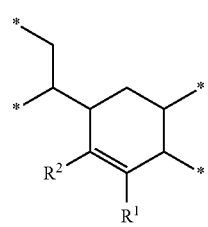
(I-f)

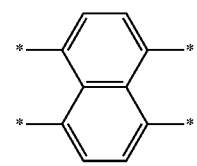
(I-g)

wherein, in formulas (I-a) to (I-g), $X^1$ represents the single bond or the divalent linking group; $Y^1$ represents the methylene group or the vinylene group; $R^1$ and $R^2$ each independently represent the hydrogen atom or the substituent; and the symbol "*" represents the binding site;

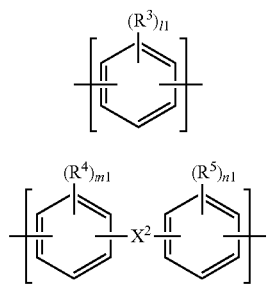
(II-a)

(II-b)

wherein, in formulas (II-a) and (II-b), $R^3$, $R^4$ and $R^5$ each independently represent the substituent; l1, m1 and n1 each independently are the integer of from 0 to 4; and $X^2$ represents the single bond or the divalent linking group; and

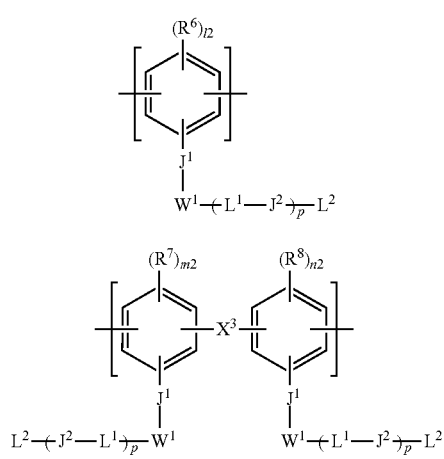
(III-a)

(III-b)

wherein, in formulas (III-a) and (III-b), $R^6$, $R^7$ and $R^8$ each independently represent the substituent; $J^1$, $J^2$ and $W^1$ each independently represent the single bond or the divalent linking group; l2, m2 and n2 each independently are the integer of from 0 to 3; $L^1$ represents the divalent linking group; $L^2$ represents a crosslinkable functional group; p represents an integer of 0 or more; $X^3$ represents the single bond or the divalent linking group; and $-J^1-W^1-(L^1-J^2)-L^2$ is the site for forming the crosslinked chain mediated by the ester linking group upon being crosslinked, and wherein the ratio [κ] of the site for forming the crosslinked chain mediated by the ester linking group to imide groups in the polyimide compound (number of the site for forming a the crosslinked chain mediated by the ester linking group/number of the imide groups in the polyimide compound) is more than 0.4 and less than 0.5;

applying a coating liquid containing both of the polyimide compound and a compound having at least two functional groups selected from an oxirane group and an oxetane group in the molecule thereof, over the gas-permeable supporting layer to form the gas separating layer; and subjecting the crosslinkable functional group to a crosslinking reaction by irradiating an active radiation or applying heat to the coating liquid, to crosslink the polyimide compound.

9. The method of producing the gas separation composite membrane according to claim 8, wherein a crosslinking conversion ratio [α] [a crosslinked site/a crosslinkable site] is set to be 5% or more and 100% or less, in the crosslinking reaction of the polyimide compound.

10. The method of producing the gas separation composite membrane according to claim 8, wherein the crosslinking reaction of the polyimide compound is carried out under the conditions of 10 to 120° C.

11. A gas separation module, containing the gas separation composite membrane according to claim 1.

12. A gas separation apparatus, containing the gas separation module according to claim 11.

13. A gas separation method, which comprises: a step of selectively permeating carbon dioxide from a gas containing carbon dioxide and methane, by using the gas separation composite membrane according to claim 1.

* * * * *